(12) United States Patent
Zhang

(10) Patent No.: US 11,808,601 B2
(45) Date of Patent: Nov. 7, 2023

(54) SYSTEM AND METHOD FOR UPDATING LINEAR TRAFFIC FEATURE DATA

(71) Applicant: HERE Global B.V., Eindhoven (NL)

(72) Inventor: Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 246 days.

(21) Appl. No.: 17/210,134

(22) Filed: Mar. 23, 2021

(65) Prior Publication Data

US 2022/0307857 A1    Sep. 29, 2022

(51) Int. Cl.
*G01C 21/30* (2006.01)
*G01C 21/00* (2006.01)

(52) U.S. Cl.
CPC ........ *G01C 21/3807* (2020.08); *G01C 21/30* (2013.01)

(58) Field of Classification Search
CPC ............................. G01C 21/3807; G01C 21/30
See application file for complete search history.

(56) References Cited

U.S. PATENT DOCUMENTS

| 9,395,192 | B1 | 7/2016 | Silver et al. |
| 9,690,994 | B2 | 6/2017 | Mori |
| 2010/0208937 | A1* | 8/2010 | Kmiecik ............... G01C 21/32 382/190 |
| 2020/0097016 | A1* | 3/2020 | Zhu ...................... G05D 1/0221 |
| 2021/0061306 | A1* | 3/2021 | Dagan ..................... H04W 4/40 |

OTHER PUBLICATIONS

Li et al., "Lane Marking Detection and Reconstruction with Line-Scan Imaging Data", Published: May 20, 2018, 22 pages.

* cited by examiner

*Primary Examiner* — Anne Marie Antonucci
*Assistant Examiner* — Jared C Bean
(74) *Attorney, Agent, or Firm* — Peter H. Yu; HERE GLOBAL B.V.

(57) ABSTRACT

A system for updating linear traffic feature data is provided. The system, for example, determines, from sensor data, the linear traffic feature data associated with a matched link. Further, the system, for example, generates heading data based on the linear traffic feature data and updates the linear traffic feature data based on the generated heading data. The heading data is generated by dropping a perpendicular to at least one of the matched link and a second link connected to the matched link.

18 Claims, 12 Drawing Sheets

SYSTEM AND METHOD FOR UPDATING LINEAR TRAFFIC FEATURE DATA

TECHNOLOGICAL FIELD

The present disclosure generally relates to routing and navigation systems, and more particularly relates to methods and systems for updating linear traffic feature data in routing and navigation systems.

BACKGROUND

Currently, various navigation systems are available for vehicle navigation. These navigation systems generally request navigation related data or map data thereof from a navigation service. The map data stored by the navigation service may be updated by sensor data. For example, the sensor data may include data about linear traffic features indicative of lane markings, guardrails, and etc. on a route. Accordingly, the sensor data should be fairly accurate and provide enough data points to accurately provide the vehicle navigation. However, the sensor data may not be accurate and/or may be too sparse.

BRIEF SUMMARY OF SOME EXAMPLE EMBODIMENTS

Generally, the sensor data that include the data about the linear traffic feature may not be accurate, due to occlusions (caused by interference of other vehicles), noise in sensors, or other defects in the sensors.

Additionally, there may be issues associated with amount of data points available in sensor data for navigation applications and other evaluations. Sometimes, the sensor data may be too sparse, that is to say, may have very less data points. Even though this sensor data may be accurate, but due to sparsity, it may not be useful for navigation applications and other evaluations. The reasons for sparsity of data may be numerous, such as previously mentioned. Accordingly, such sparse sensor data needs to be supplemented to make it complete and useful for further evaluations and applications. The sparse data may include the data about linear traffic features and may need to be supplemented. In the various embodiments described herein, the sparse sensor data may be supplemented with map data, to make it completer and more useful, than the sparse data. Hereinafter, the 'data about the linear traffic feature' and 'linear traffic feature data' may be interchangeably used to mean the same.

In order to solve the foregoing problem, various embodiments are provided for determining, from the sensor data, the linear traffic feature data associated with a matched link. As used herein, the linear traffic feature data may include a plurality of linear traffic feature points, where each linear traffic feature point may be indicative of data (e.g. image data) of the linear traffic feature. As used herein, the linear traffic feature may include a border of a link (and/or a border of a lane of the link), where the border may be represented by one or more of lane markings, guardrails, road curbs, road medians, road barriers, and the like. As used herein, the matched link may include a link on which a vehicle is currently traveling.

Various embodiments are provided for generating heading data based on the linear traffic feature data. In various embodiments, the heading data may be generated by dropping a perpendicular to at least one of the matched link and a second link connected to the matched link. For dropping the perpendicular to at least one of the matched link and the second link, it is an objective of some embodiments to identify a side of the linear traffic feature data with respect to the matched link. In various embodiments, the side of the linear traffic feature data may be identified as at least of a left-side with respect to the matched link or a right-side with respect to the matched link.

Various embodiments are provided for updating the linear traffic feature data, based on the generated heading data. In various embodiments, for updating the linear traffic feature data based on the generated heading data, at least two derived locations along the generated heading data may be determined. Further, a linear traffic feature location may be determined based on the determined at least two derived locations and the determined linear traffic feature location may be used to update the linear traffic feature data. The updated linear traffic feature data may be used to update the map data and/or to provide one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

A system, a method and a computer programmable product are provided in accordance with an example embodiment described herein for updating the linear traffic feature data.

In one aspect, a system for updating the linear traffic feature data is disclosed. The system may include a memory configured to store computer-executable instructions; and at least one processor configured to execute the computer-executable instructions to: determine, from sensor data, the linear traffic feature data associated with a matched link; generate heading data based on the linear traffic feature data, wherein the generation of the heading data comprises dropping a perpendicular to at least one of the matched link and a second link connected to the matched link; and update the linear traffic feature data, based on the generated heading data.

In additional system embodiments, to generate the heading data, the at least one processor may be further configured to: determine location data associated with the linear traffic feature data; identify a side of the linear traffic feature data with respect to the matched link, based on the determined location data; and generate the heading data, based on the identified side of the linear traffic feature data.

In additional system embodiments, to generate the heading data, the at least one processor may be further configured to: determine a plurality of shape locations associated with at least one of the matched link and the second link; determine one or more of at least one matched heading between the plurality of shape locations associated with the matched link or at least one matched heading between the plurality of shape locations associated with the matched link and the plurality of shape locations associated with the second link; identify the side of the linear traffic feature data with respect to the matched link, based on the determined location data and one or more of the at least one matched heading between the plurality of shape locations associated with the matched link or the at least one matched heading between the plurality of shape locations associated with the matched link and the plurality of shape locations associated with the second link; and generate the heading data, based on the identified side of the linear traffic feature data.

In additional system embodiments, to update the linear traffic feature data, the at least one processor may be further configured to: determine at least two derived locations along the generated heading data; determine a linear traffic feature location, based on the determined at least two derived locations; and update the linear traffic feature data, based on the linear traffic feature location.

In additional system embodiments, to determine the at least two derived locations along the generated heading data, the at least one processor may be further configured to: identify a distance between the linear traffic feature data and the matched link; and determine the at least two derived locations along the generated heading data, based on the identified distance and a link deviation location, wherein the link deviation location is an origin to determine the at least two derived locations.

In additional system embodiments, to determine the linear traffic feature location, the at least one processor may be further configured to: generate a linear traffic feature line at each of the at least two derived locations, wherein the linear traffic feature line is parallel to at least one of the matched link and the second link; identify an intersecting location between the generated linear traffic feature lines; and determine the intersection location as the linear traffic feature location.

In additional system embodiments, to generate the heading data, the at least one processor may be further configured to: determine a status of the linear traffic feature data associated with the matched link, wherein the status of the linear traffic feature data indicates at least one of discontinuous linear traffic feature data or continuous linear traffic feature data; and generate the heading data, in response to determining the status of the linear traffic feature data is indicative of the discontinuous linear traffic feature data.

In additional system embodiments, to determine the linear traffic feature data associated with the matched link, the at least one processor may be further configured to: identify the matched link, based on map-matching the sensor data with map data; and determine, using the map data, the linear traffic feature data associated with the matched link.

In additional system embodiments, the at least one processor may be further configured to update map data to include the updated linear traffic feature data for the matched link.

In another aspect, a method for updating the linear traffic data is disclosed. The method may include: determining, from sensor data, the linear traffic feature data associated with a matched link; determining at least two derived locations, based on a distance between the linear traffic feature data and the matched link; and updating the linear traffic feature data, based on the determined at least two derived locations.

In additional method embodiments, determining the at least two derived locations may further comprise: generating heading data based on the linear traffic feature data, wherein the generation of the heading data comprises dropping a perpendicular to at least one of the matched link and a second link connected to the matched link; identifying a distance between the linear traffic feature data and the matched link; and determining the at least two derived locations along the generated heading data, based on the identified distance and a link deviation location, wherein the link deviation location is an origin to determine the at least two derived locations.

In additional method embodiments, generating the heading data may further comprise: determining a status of the linear traffic feature data associated with the matched link, wherein the status of the linear traffic feature data indicates at least one of discontinuous linear traffic feature data or continuous linear traffic feature data; and generating the heading data, in response to determining the status of the linear traffic feature data is indicative of the discontinuous linear traffic feature data.

In additional method embodiments, generating the heading data may further comprise: determining location data associated with the linear traffic feature data; identifying a side of the linear traffic feature data with respect to the matched link, based on the determined location data; and generating the heading data, based on the identified side of the linear traffic feature data.

In additional method embodiments, generating the heading data may further comprise: determining a plurality of shape locations associated with at least one of the matched link and the second link; determining one or more of at least one matched heading between the plurality of shape locations associated with the matched link or at least one matched heading between the plurality of shape locations associated with the matched link and the plurality of shape locations associated with second link; identifying the side of the linear traffic feature data with respect to the matched link, based on the determined location data and one or more of the at least one matched heading between the plurality of shape locations associated with the matched link or the at least one matched heading between the plurality of shape locations associated with the matched link and the plurality of shape locations associated with the second link; and generating the heading data, based on the identified side of the linear traffic feature data.

In additional method embodiments, updating the linear traffic feature data may further comprise: determining a linear traffic feature location, based on the determined at least two derived locations; and updating the linear traffic feature data, based on the linear traffic feature location.

In additional method embodiments, determining the linear traffic feature location may further comprise: generating a linear traffic feature line at each of the at least two derived locations, wherein the linear traffic feature line is parallel to at least one of the matched link and the second link; identifying an intersecting location between the generated linear traffic feature lines; and determining the intersection location as the linear traffic feature location.

In yet another aspect, a computer program product comprising a non-transitory computer readable medium having stored thereon computer executable instruction which when executed by at least one processor, cause the processor to carry out operations for updating linear traffic feature data, the operations comprising: determining, from sensor data, the linear traffic feature data associated with a matched link; generating heading data based on the linear traffic feature data, wherein the generation of the heading data comprises dropping a perpendicular to at least one of the matched link and a second link connected to the matched link; and updating the linear traffic feature data, based on the generated heading data.

In additional computer program product embodiments, for generating the heading data, the operations may further comprise: determining location data associated with the linear traffic feature data; identifying a side of the linear traffic feature data with respect to the matched link, based on the determined location data; and generating the heading data, based on the identified side of the linear traffic feature data.

In additional computer program product embodiments, for generating the heading data, the operations may further comprise: determining a plurality of shape locations associated with at least one of the matched link and the second link; determining one or more of at least one matched heading between the plurality of shape locations associated with the matched link or at least one matched heading between the plurality of shape locations associated with the matched link and the plurality of shape locations associated with second link; identifying the side of the linear traffic feature data with respect to the matched link, based on the determined location data and one or more of the at least one matched heading between the plurality of shape locations associated with the matched link or the at least one matched heading between the plurality of shape locations associated with the matched link and the plurality of shape locations associated with the second link; and generating the heading data, based on the identified side of the linear traffic feature data.

In additional computer program product embodiments, for updating the linear traffic feature data, the operations may further comprise: determining at least two derived locations along the generated heading data; determining a linear traffic feature location, based on the determined at least two derived locations; and updating the linear traffic feature data, based on the linear traffic feature location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
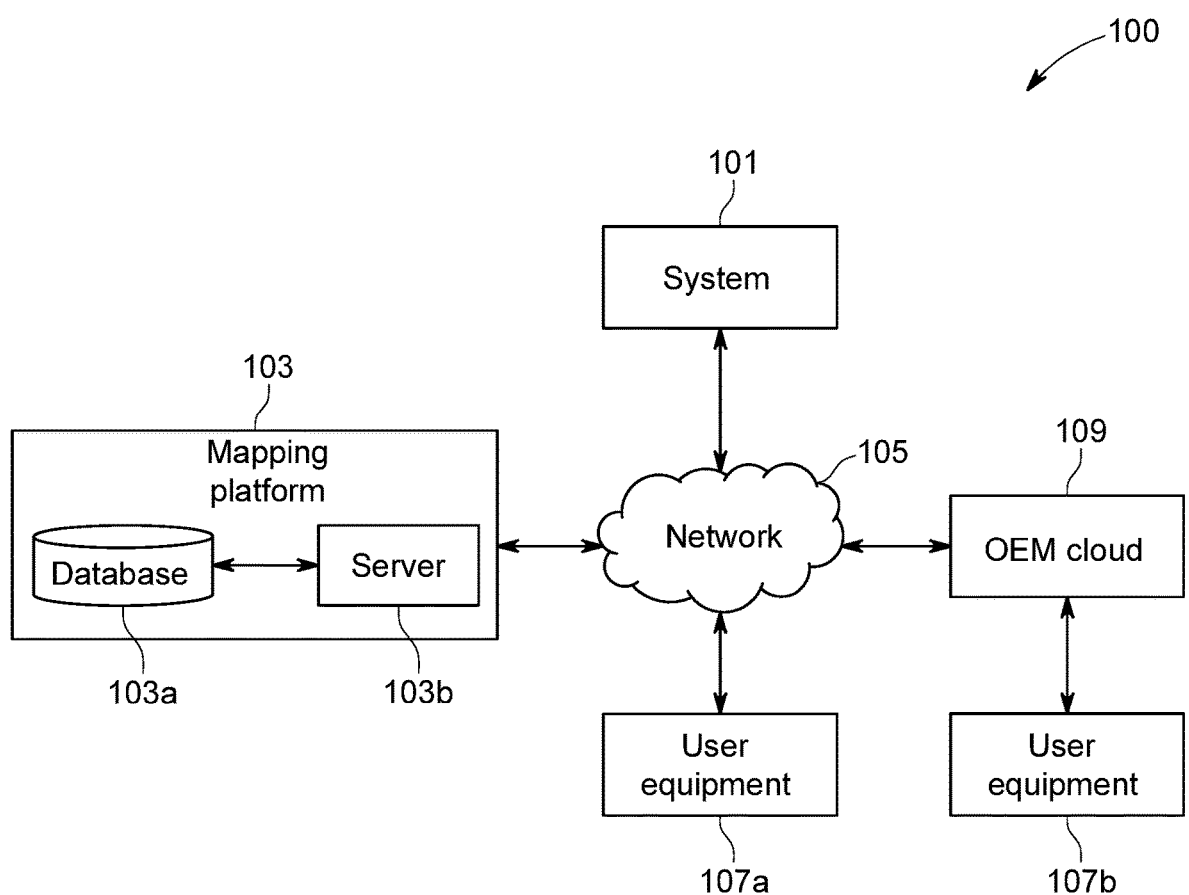
Figure 2:
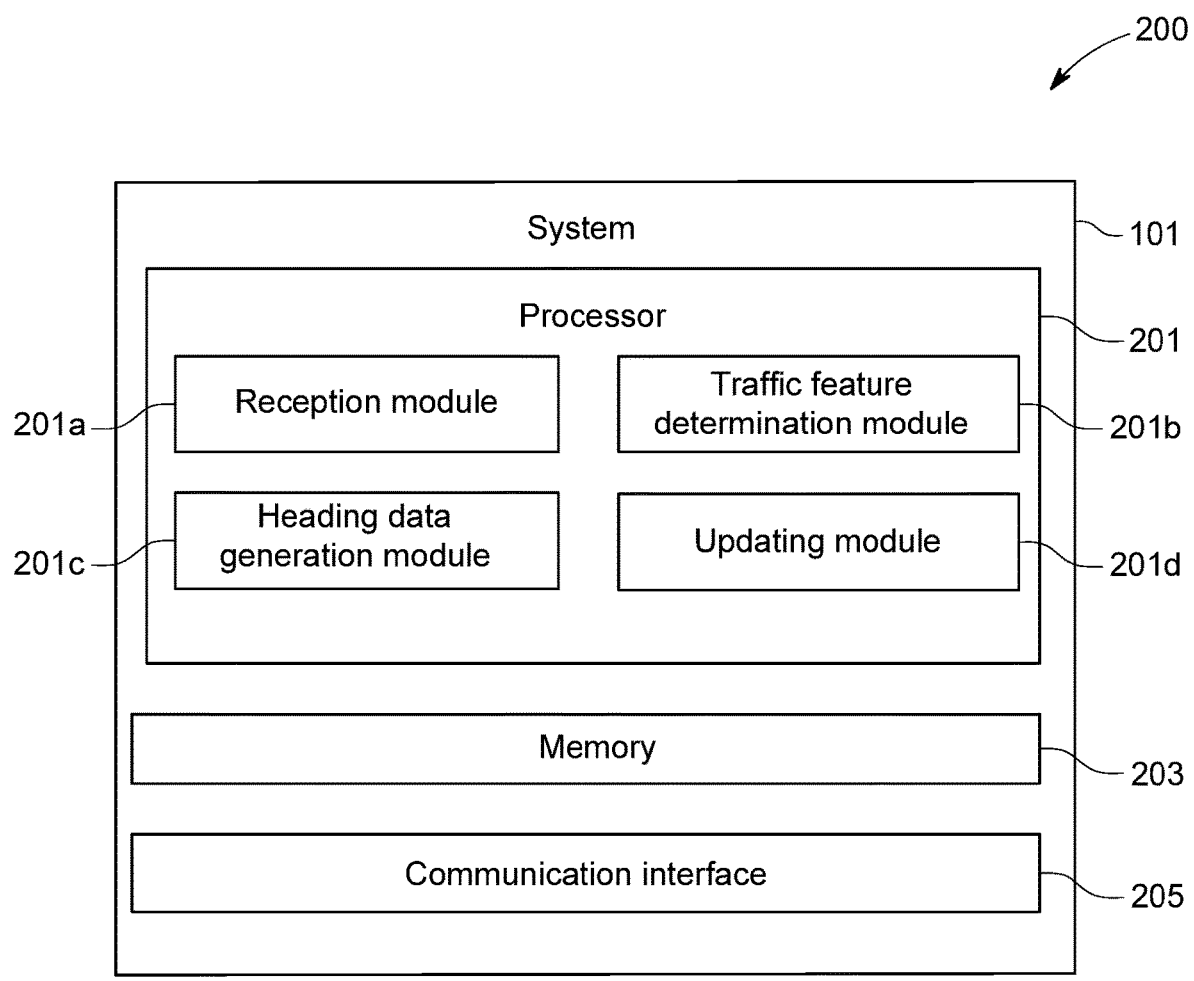
Figure 3A:
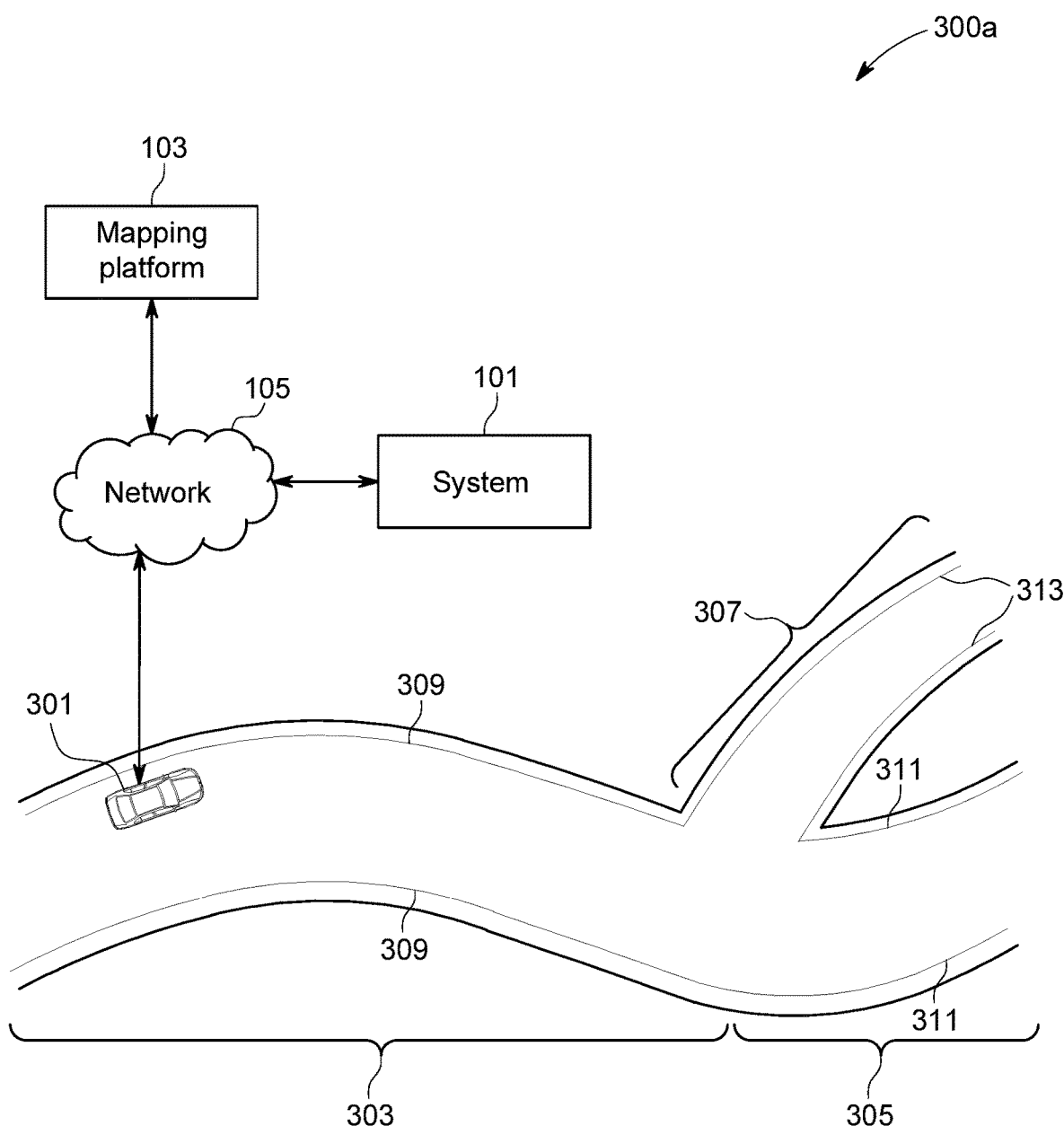
Figure 3B:
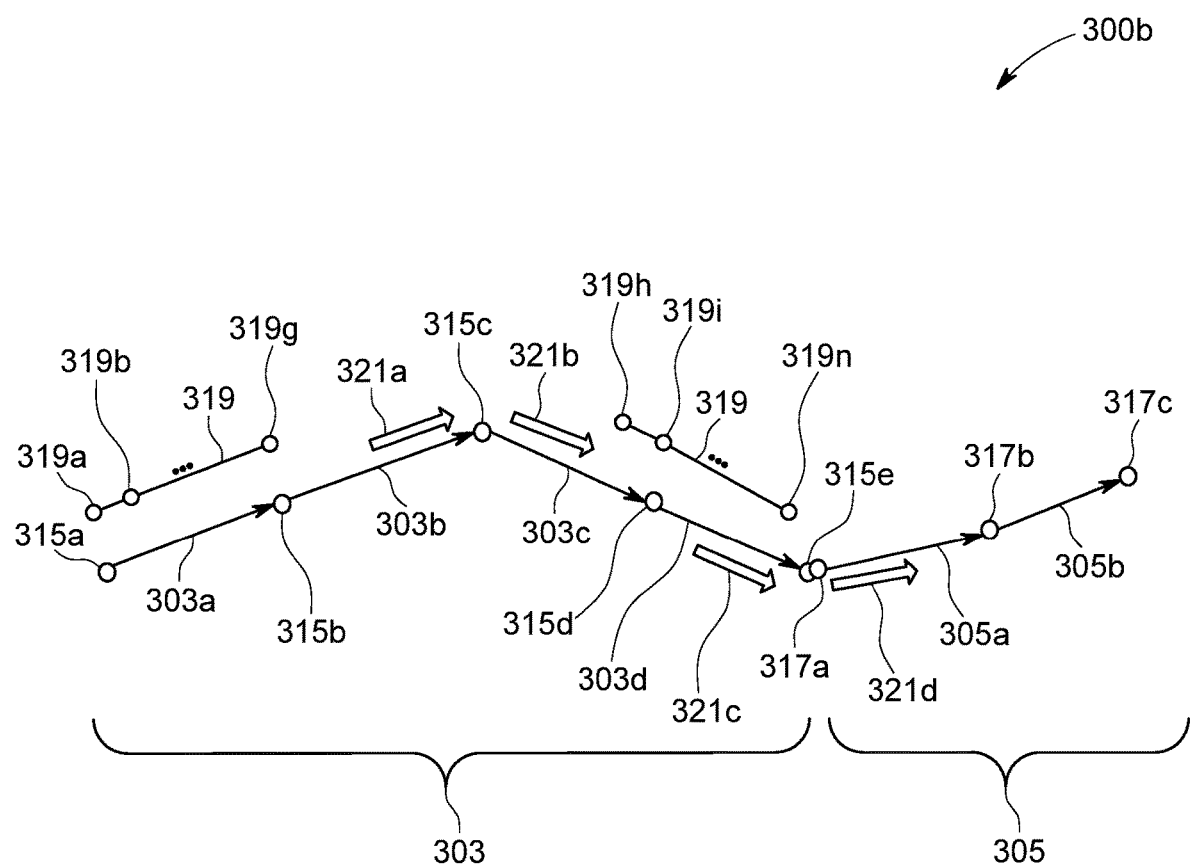
Figure 3C:
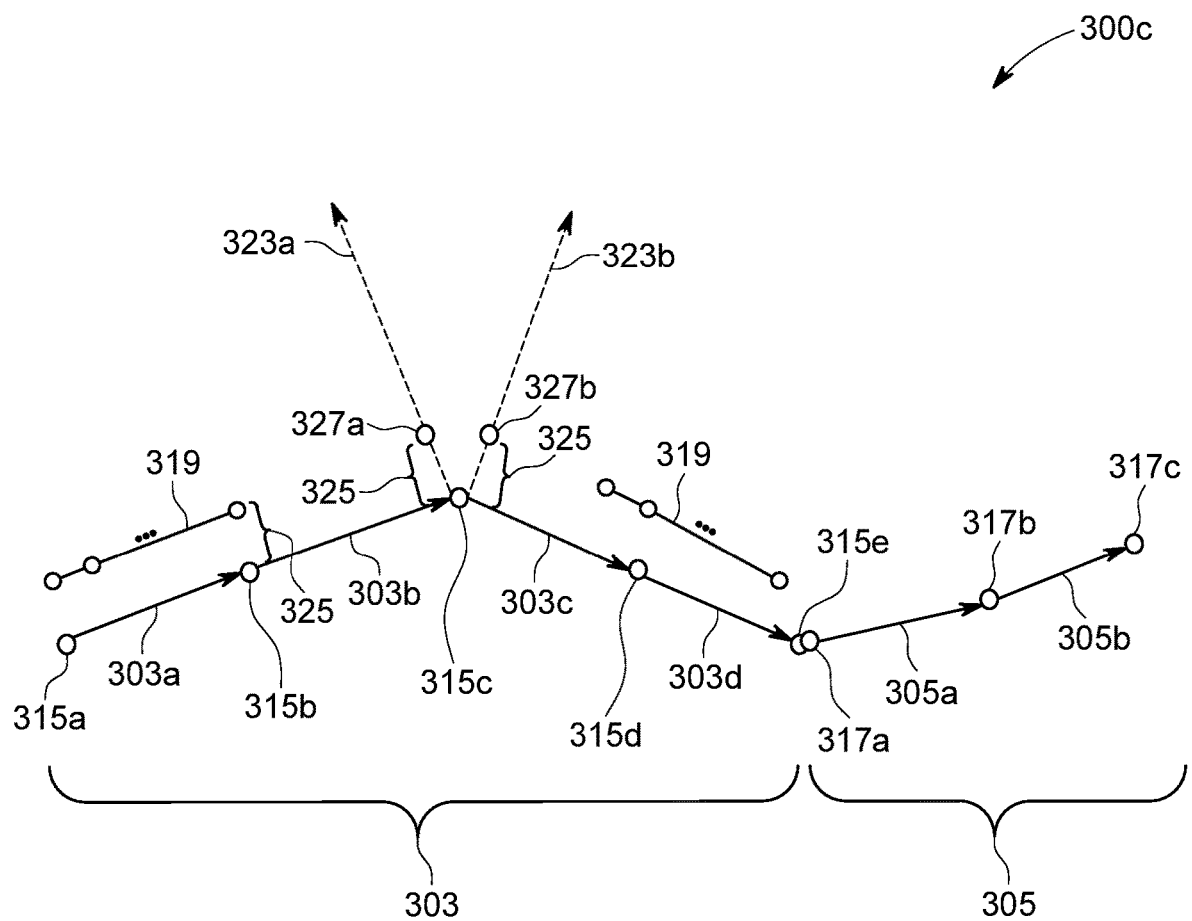
Figure 3D:
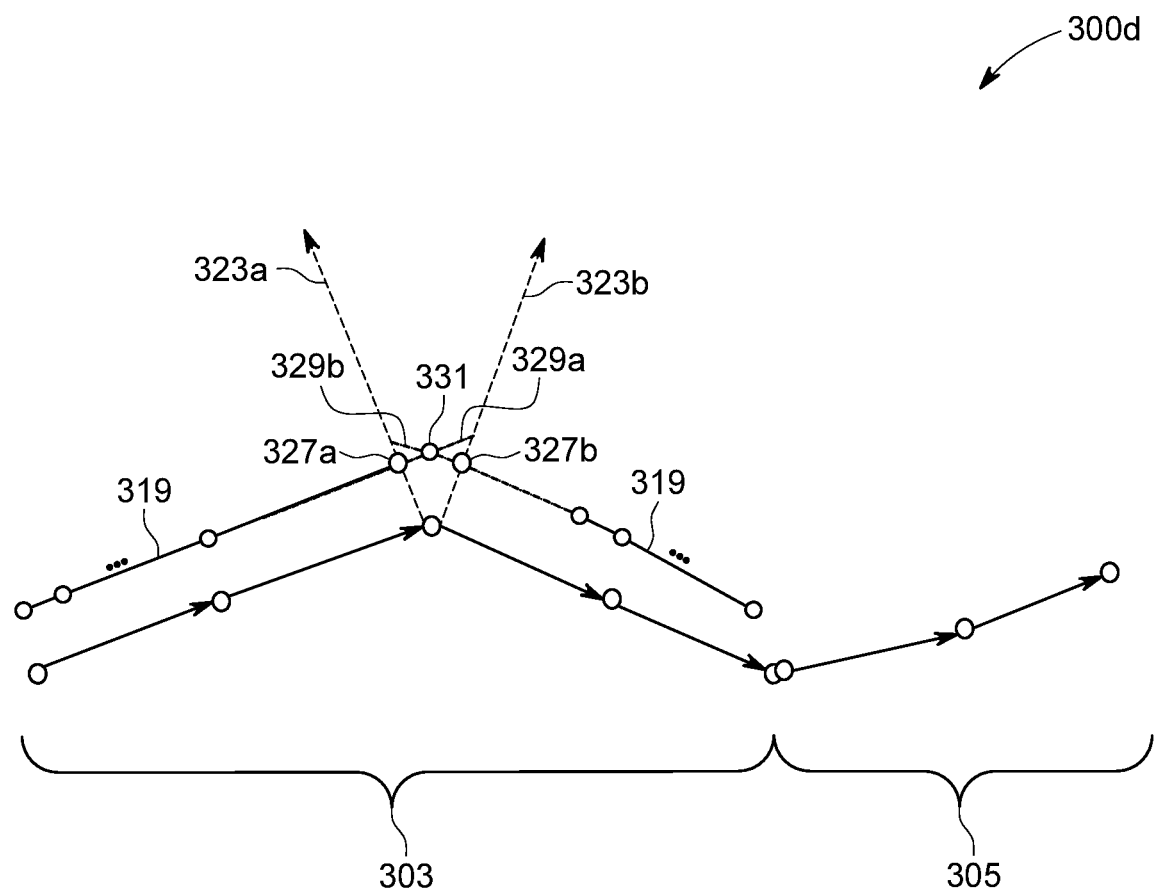
Figure 4A:
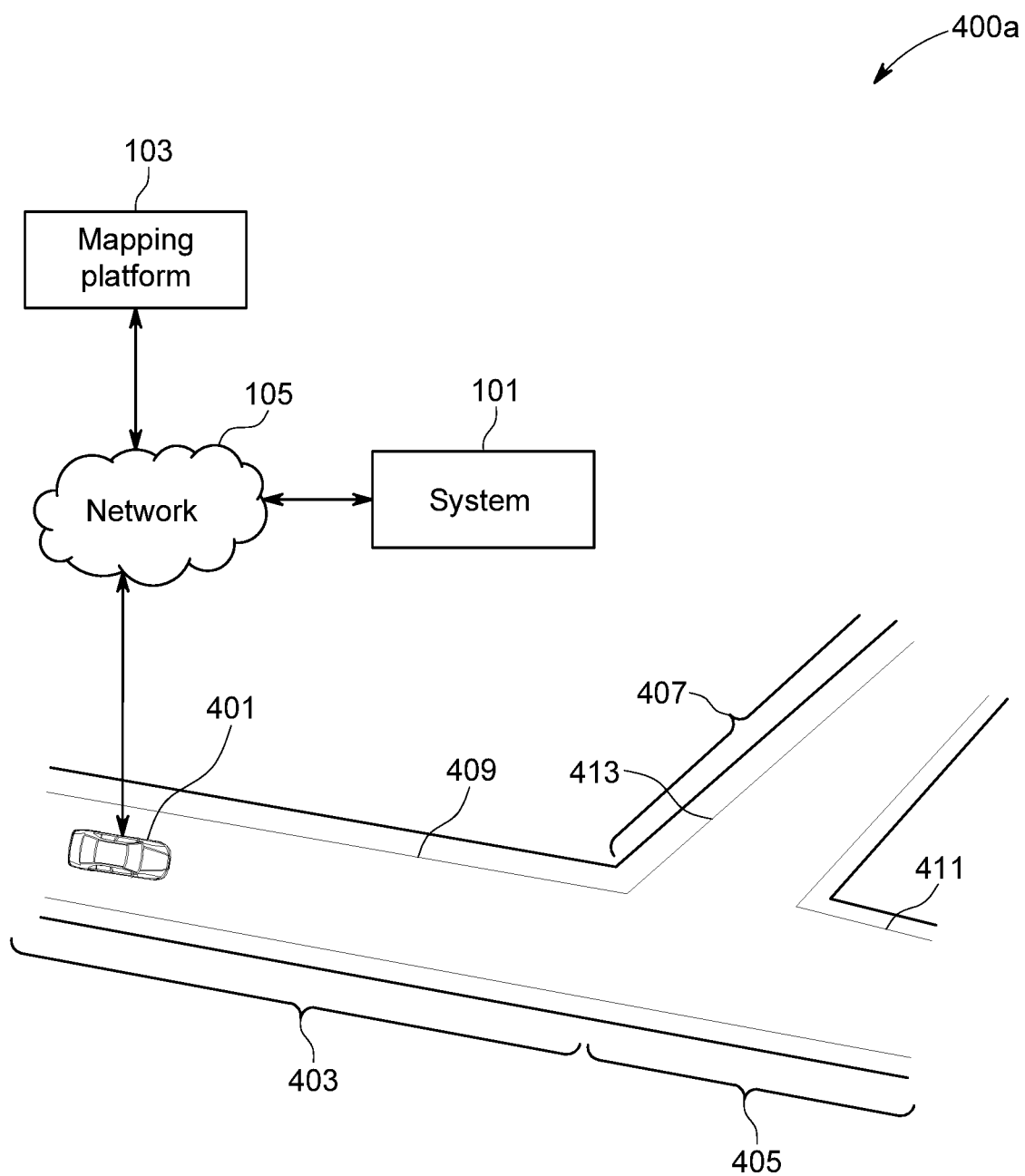
Figure 4B:
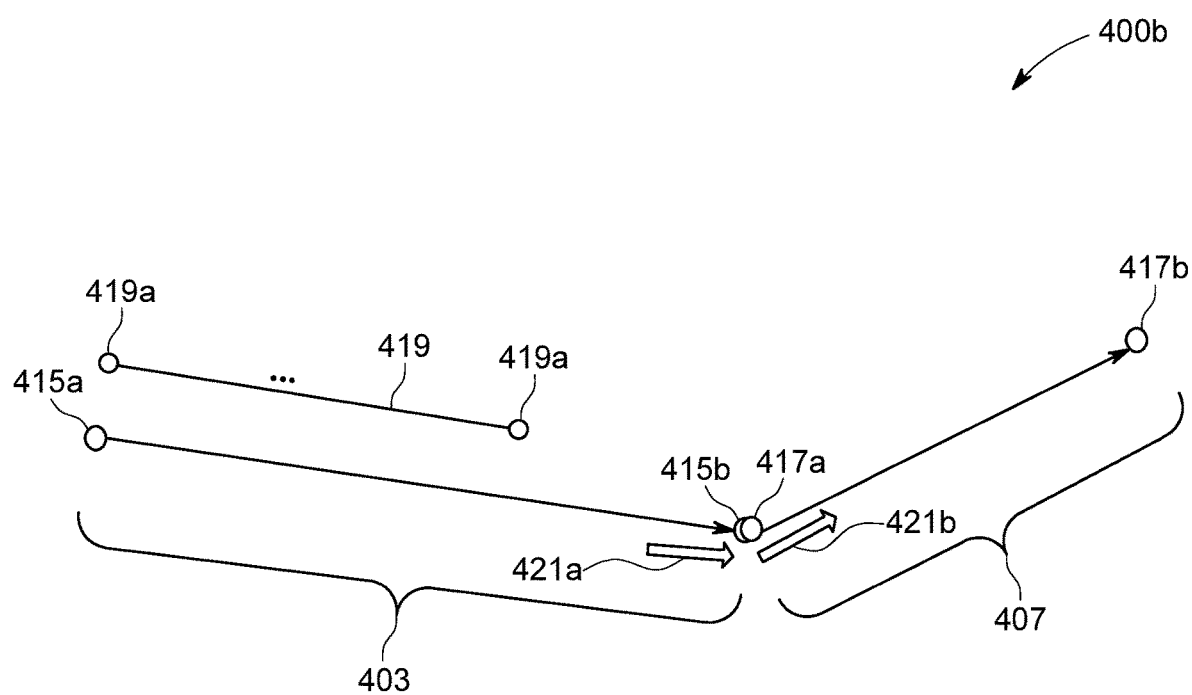
Figure 4C:
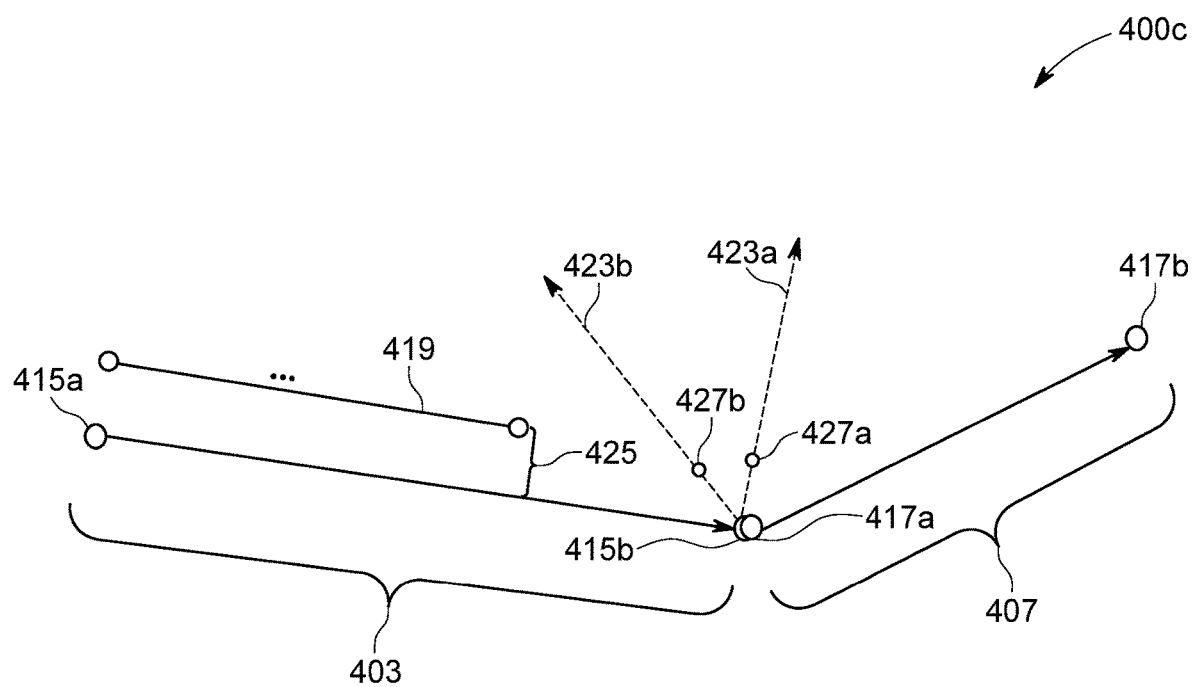
Figure 4D:
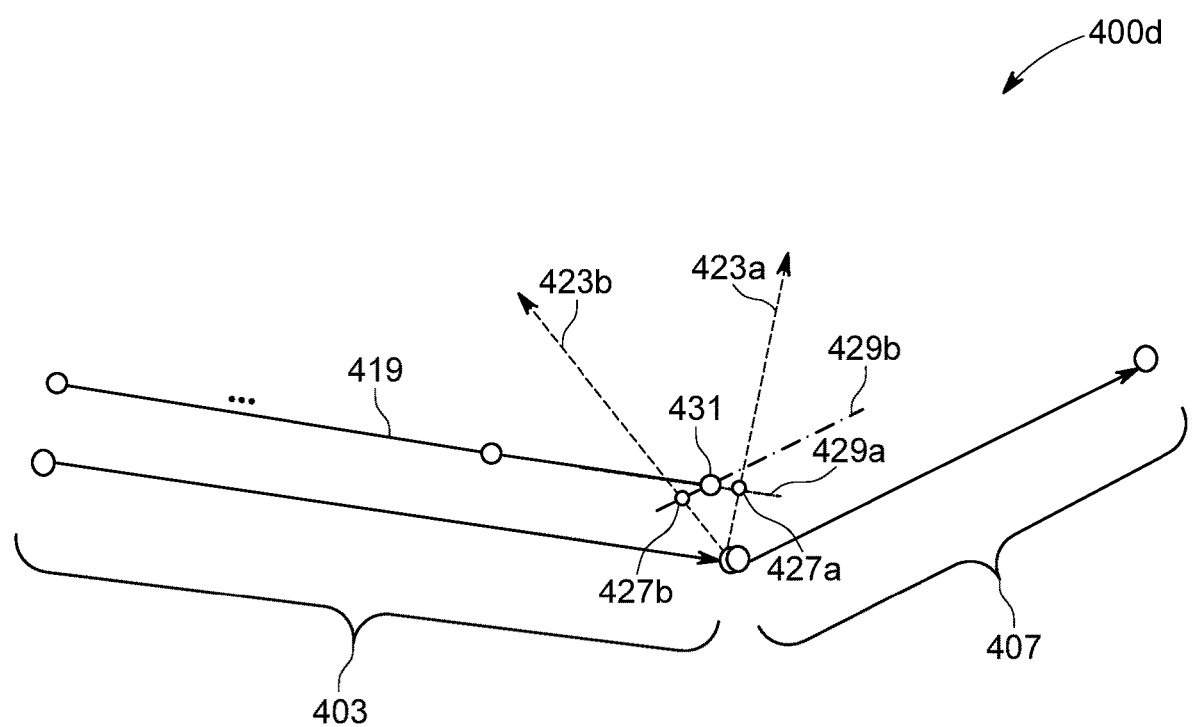
Figure 5A:
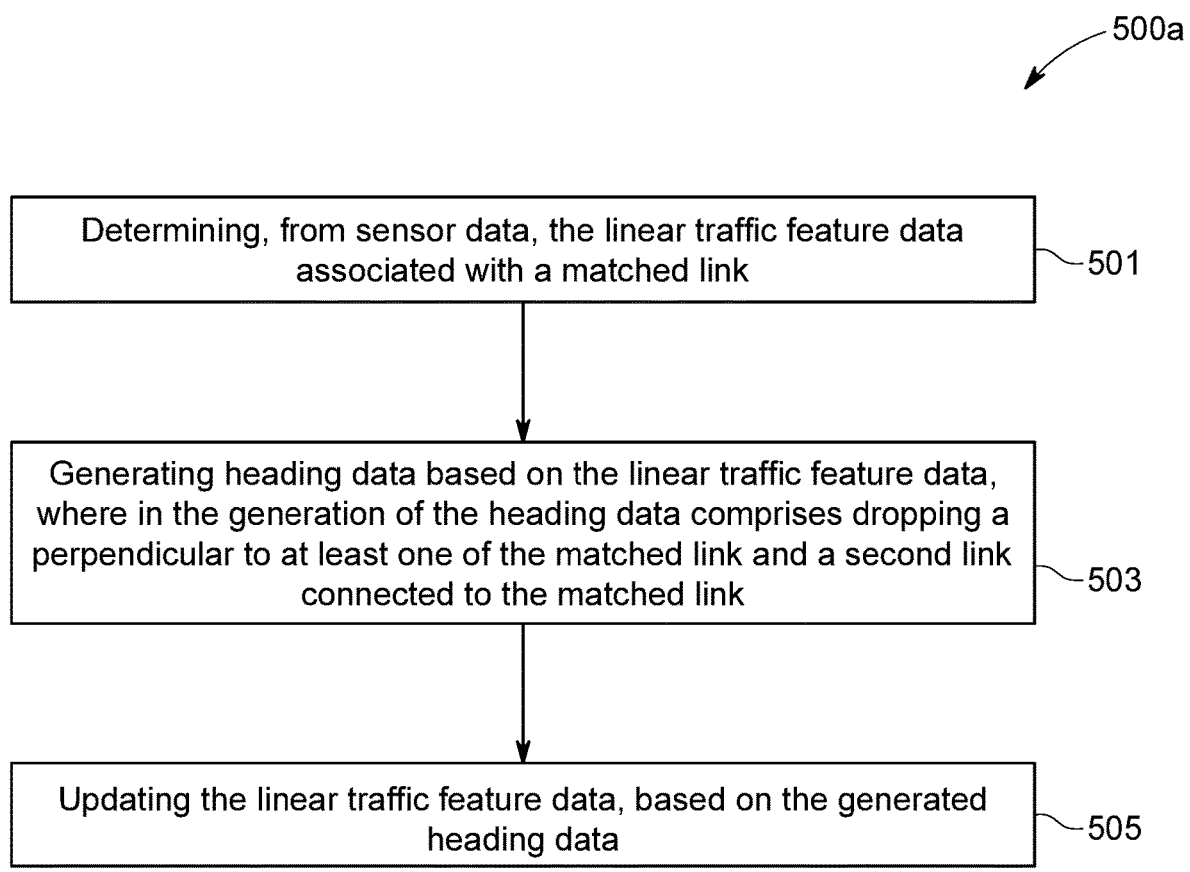
Figure 5B:
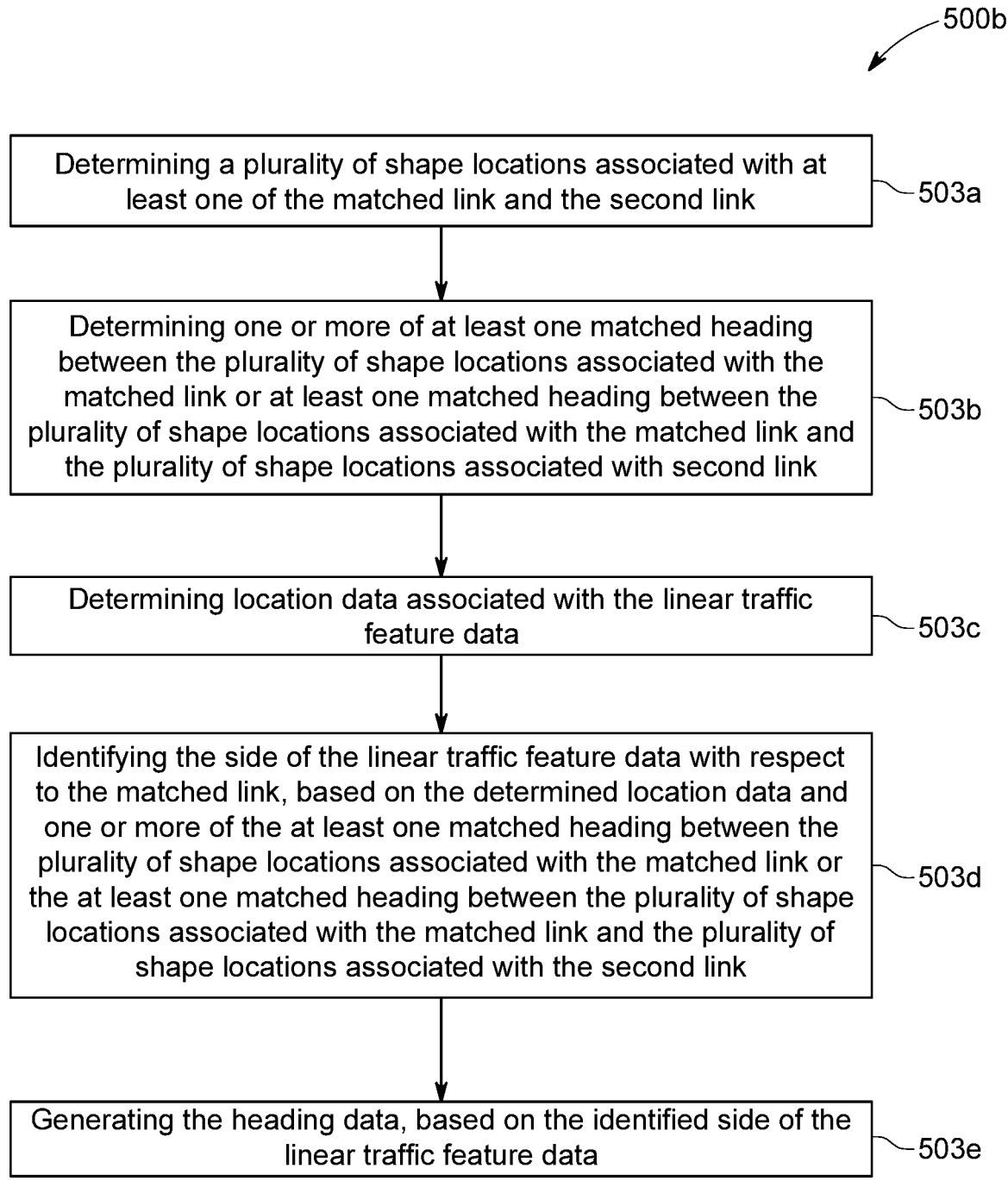

Having thus described example embodiments of the invention in general terms, reference will now be made to the accompanying drawings, which are not necessarily drawn to scale, and wherein:

FIG. 1 illustrates a block diagram showing a network environment of a system for updating linear traffic feature data, in accordance with one or more example embodiments;

FIG. 2 illustrates a block diagram of the system for updating the linear traffic feature data, in accordance with one or more example embodiments;

FIG. 3A illustrates a first exemplary working environment of the system for updating the linear traffic feature data, in accordance with one or more example embodiments;

FIG. 3B illustrates a schematic for determining matched headings, in accordance with one or more example embodiments;

FIG. 3C illustrates a schematic for determining heading data, in accordance with one or more example embodiments;

FIG. 3D illustrates a schematic for updating the linear traffic feature data, in accordance with one or more example embodiments;

FIG. 4A illustrates a second exemplary working environment of the system for updating the linear traffic feature data, in accordance with one or more example embodiments;

FIG. 4B illustrates a schematic for determining the matched headings, in accordance with one or more example embodiments;

FIG. 4C illustrates a schematic for determining the heading data, in accordance with one or more example embodiments;

FIG. 4D illustrates a schematic for updating the linear traffic feature data, in accordance with one or more example embodiments;

FIG. 5A illustrates a flowchart depicting a method for updating the linear traffic feature data, in accordance with one or more example embodiments; and FIG. 5B illustrates a flowchart depicting a method for generating the heading data, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for updating linear traffic feature data. Various embodiments are provided for determining, from the sensor data, the linear traffic feature data associated with a matched link. As used herein, the linear traffic feature data may include a plurality of linear traffic feature points, where each linear traffic feature point may be indicative of data (e.g. image data) of the linear traffic feature. As used herein, the linear traffic feature may include a border of a link (and/or a border of a lane of the link), where the border may be represented by one or more of lane markings, guardrails, road curbs, road medians, road barriers, and the like. As used herein, the matched link may include a link on which a vehicle is currently traveling.

Various embodiments are provided generating heading data based on the linear traffic feature data. In various embodiments, the heading data may be generated by dropping a perpendicular to at least one of the matched link and a second link connected to the matched link. For dropping the perpendicular to at least one of the matched link and the second link, it is an objective of some embodiments to identify a side of the linear traffic feature data with respect to the matched link. In various embodiments, the side of the linear traffic feature data may be identified as at least of a left-side with respect to the matched link or a right-side with respect to the matched link.

Various embodiments are provided for updating the linear traffic feature data, based on the generated heading data. In various embodiments, for updating the linear traffic feature data based on the generated heading data, at least two derived locations along the generated heading data may be determined. Further, a linear traffic feature location may be determined based on the determined at least two derived locations and the determined linear traffic feature location may be used to update the linear traffic feature data. The updated linear traffic feature data may be used to update the map data and/or to provide one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

FIG. 1 illustrates a block diagram 100 showing a network environment of a system 101 for updating the linear traffic feature data, in accordance with one or more example embodiments. The system 101 may be communicatively coupled, via a network 105, to one or more of a mapping platform 103, a user equipment 107a, and/or an OEM (Original Equipment Manufacturer) cloud 109. The OEM cloud 109 may be further connected to a user equipment 107b. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud based service, a cloud based application, a cloud based platform, a remote server based service, a remote server based application, a remote server based platform, or a virtual computing system. As such, the system 101 may be configured to operate inside the mapping platform 103 and/or inside at least one of the user equipment 107a and the user equipment 107b.

In some embodiments, the system 101 may be embodied within one or both of the user equipment 107a and the user equipment 107b, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to update the linear traffic feature data.

In some other embodiments, the system 101 may be a server 103b of the mapping platform 103 and therefore may be co-located with or within the mapping platform 103. In yet some other embodiments, the system 101 may be implemented within an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103. Further, in some example embodiments, the system 101 may be a standalone unit configured to update the linear traffic feature data for the autonomous vehicle. Additionally, the system 101 may be coupled with an external device such as the autonomous vehicle.

The mapping platform 103 may comprise a map database 103a (also referred to as geographic database 103a) for storing map data and a processing server 103b for carrying out the processing functions associated with the mapping platform 103. The map database 103a may store node data, road segment data or link data, point of interest (POI) data, road obstacles related data, traffic objects related data, posted signs related data, such as road sign data, or the like. The map database 103a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. One node represents a point at one end of the respective link and the other node represents a point at the other end of the respective link. The node at either end of a link corresponds to a location at which the road meets another road, e.g., an intersection, or where the road dead ends. An intersection may not necessarily be a place at which a turn from one road to another is permitted, but represents a location at which one road and another road have the same latitude, longitude and elevation. In some cases, a node may be located along a portion of a road between adjacent intersections, e.g., to indicate a change in road attributes, a railroad crossing, or for some other reason. (The terms "node" and "link" represent only one terminology for describing these physical geographic features and other terminology for these features is intended to be encompassed within the scope of these concepts.) The link data and the node data may represent a road network used by vehicles such as cars, trucks, buses, motorcycles, and/or other entities.

Optionally, the map database 103a may contain path segment and node data records, or other data that may represent pedestrian paths or areas in addition to or instead of the vehicle road record data, for example. The link/road segments and nodes may be associated with attributes, such as geographic coordinates and other navigation related attributes, as well as POIs, such as fueling stations, hotels, restaurants, museums, stadiums, offices, auto repair shops, buildings, stores, parks, etc. The navigation related attributes may include one or more of travel speed data (e.g. data indicative of a permitted speed of travel) on the road represented by the link data record, a travel direction data (e.g. data indicative of a permitted direction of travel) on the road represented by the link data record, the linear traffic feature data on the road represented by the link data record, street address ranges of the road represented by the link data record, the name of the road represented by the link data record, and the like. As used herein, the 'linear traffic feature data' may be data indicative of a liner traffic feature along the road represented by the link data record. The linear traffic feature may be at least one of lane markings, road curbs, guardrails, road medians, road barriers, and the like along the road. The various navigation related attributes associated with a link may be included in a single data record or may be included in more than one type of record which are referenced to each other. In one embodiment, one or more HD layers may be associated with the link-node map as attributes or features. For example, an HD lane data layer may be provided that associates lane or lane marking data with the respective segments and/or nodes.

Each link data record that represents an other-than-straight road segment may include shape location data. A shape location is a location along a link between its endpoints. For instance, to represent the shape of other-than-straight roads, a geographic database developer may select one or more shape locations along the other-than-straight road portion. The shape location data included in the link data record indicate a position, (e.g., latitude, longitude, and optionally, altitude or elevation) of the selected shape points along the represented link.

Additionally, the map database 103a may also include data about the POIs and their respective locations in the POI records. The map database 103a may further include data about places, such as cities, towns, or other communities, and other geographic features such as bodies of water, mountain ranges, etc. Such place or feature data may be part of the POI data or may be associated with POIs or POI data records (such as a data point used for displaying a city). In addition, the map database 103a may include event data (e.g., traffic incidents, construction activities, scheduled events, unscheduled events, etc.) associated with the POI data records or other records of the map database 103a.

The map database 103a may be maintained by a content provider e.g., a map developer. By way of example, the map developer may collect the map data to generate and enhance the map database 103a. There may be different ways used by the map developer to collect data. These ways may include obtaining data from other sources, such as municipalities or respective geographic authorities. In addition, the map developer may employ field personnel to travel by vehicle (also referred to as a dedicated vehicle) along roads throughout a geographic region to observe features and/or record information about them, for example. Also, remote sensing, such as aerial or satellite photography, may be used to collect the map data. In some example embodiments, the map data in the map database 103a may be stored as a digital map. The digital map may correspond to satellite raster imagery, bitmap imagery, or the like. The satellite raster imagery/bitmap imagery may include map features (such as link/road segments, nodes, and the like) and the navigation related attributes associated with the map features. In some embodiments, the map features may have a vector representation form. Additionally, the satellite raster imagery may include three dimensional (3D) map data that corresponds to 3D map features, which are defined as vectors, voxels, or the like.

According to some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, the map data may be compiled (such as into a platform specification format (PSF format)) to organize and/or configure the data for performing navigation-related functions and/or services, such as route calculation, route guidance, map display, speed calculation, distance and travel time functions, navigation instruction generation and other functions, by a navigation device, such as by the user equipment 107a and/or 107b. The navigation-related functions may correspond to vehicle navigation, pedestrian navigation, navigation instruction suppression, navigation instruction generation based on user preference data or other types of navigation. The compilation to produce the end user databases may be performed by a party or entity separate from a map developer. For example, a customer of the map developer, such as a navigation device developer or other end user device developer, a navigation app service provider and the like may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 107*a* and/or the user equipment 107*b* to provide navigation and/or map-related functions. For example, the map database 103*a* may be used with the user equipment 107*a* and/or the user equipment 107*b* to provide an end user with navigation features. In such a case, the map database 103*a* may be downloaded or stored locally (cached) on the user equipment 107*a* and/or the user equipment 107*b*.

The processing server 103*b* may comprise processing means, and communication means. For example, the processing means may comprise one or more processors configured to process requests received from the user equipment 107*a* and/or the user equipment 107*b*. The processing means may fetch map data from the map database 103*a* and transmit the same to the user equipment 107*b* via the OEM cloud 109 in a format suitable for use by the one or both of the user equipment 107*a* and/or the user equipment 107*b*. In one or more example embodiments, the mapping platform 103 may periodically communicate with the user equipment 107*a* and/or the user equipment 107*b* via the processing server 103*b* to update a local cache of the map data stored on the user equipment 107*a* and/or the user equipment 107*b*. Accordingly, in some example embodiments, the map data may also be stored on the user equipment 107*a* and/or the user equipment 107*b* and may be updated based on periodic communication with the mapping platform 103 via the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In some example embodiments, the user equipment 107*a* and the user equipment 107*b* may be any user accessible device such as a mobile phone, a smartphone, a portable computer, and the like that are portable in themselves or as a part of another portable/mobile object such as a vehicle. The user equipment 107*a* and 107*b* may comprise a processor, a memory, and a communication interface. The processor, the memory, and the communication interface may be communicatively coupled to each other. In some example embodiments, the user equipment 107*a* and 107*b* may be associated, coupled, or otherwise integrated with a vehicle, such as an advanced driver assistance system (ADAS), a personal navigation device (PND), a portable navigation device, an infotainment system and/or other device that may be configured to provide route guidance and navigation related functions to the user. In such example embodiments, the user equipment 107*a* and 107*b* may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 107*a* and 107*b*. For example, the user equipment 107*a* and 107*b* may be configured to execute and run mobile applications such as a messaging application, a browser application, a navigation application, and the like.

In one embodiment, at least one user equipment such as the user equipment 107*a* may be directly coupled to the system 101 via the network 105. For example, the user equipment 107*a* may be a dedicated vehicle (or a part thereof) for gathering data for development of the map data stored in the map database 103*a*. In another embodiment, at least one user equipment such as the user equipment 107*b* may be coupled to the system 101 via the OEM cloud 109 and the network 105. For example, the user equipment 107*b* may be a consumer vehicle (or a part thereof) and may be a beneficiary of the services provided by the system 101. In some example embodiments, one or more of the user equipment 107*a* and 107*b* may serve the dual purpose of a data gatherer and a beneficiary device. At least one of the user equipment 107*a* and 107*b* may be configured to capture sensor data associated with the link/road segment, while traversing along the link/road segment. For example, the senor data may include image data of the linear traffic feature along the link/road segment, among other things. The sensor data may be collected from one or more sensors in the user equipment 105*a* and/or user equipment 105*b*. As disclosed in conjunction with various embodiments disclosed herein, the system 101 may update the linear traffic feature data using the sensor data.

FIG. 2 illustrates a block diagram 200 of the system 101 for updating the linear traffic feature data, in accordance with one or more example embodiment. The system 101 may include at least one processor 201, a memory 203, and a communication interface 205. Further, the system 101 may comprise a reception module 201*a*, a traffic feature determination module 201*b*, a heading data generation module 201*c*, and an updating module 201*d*. In various embodiments, the reception module 201*a* may be configured to receive the sensor data. In various embodiments, the traffic feature determination module 201*b* may be configured to determine, from the sensor data, the linear traffic feature data associated with a matched link. In various embodiments, the heading data generation module 201*c* may be configured to generate the heading data based on the linear traffic feature data. In some embodiments, the heading data generation module 201*c* may generate the heading data by dropping a perpendicular to at least one of the matched link and a second link connected to the matched link. In various embodiments, the updating module 201*d* may be configured to update the linear traffic feature data, based on the generated heading data.

According to some embodiments, each of the modules 201*a*-201*d* may be embodied in the processor 201. The processor 201 may retrieve computer program code instructions that may be stored in the memory 203 for execution of the computer program code instructions, which may be configured for updating the linear traffic feature data.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with a memory 203 via a bus for passing information to mapping platform 103. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the system 101 to carry out various functions in accordance with an example embodiment of the present disclosure. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present disclosure while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to a user of the system 101, where the user may be a traveler, a driver of the vehicle and the like. In some embodiments, the user may be or correspond to an autonomous or semi-autonomous vehicle. The IoT related capabilities may in turn be used to provide smart navigation solutions by providing real time updates to the user to take pro-active decision on lane maintenance, speed determination, lane-level speed determination, turn-maneuvers, lane changes, overtaking, merging and the like. The system 101 may be accessed using the communication interface 205. The communication interface 205 may provide an interface for accessing various features and data stored in the system 101. For example, the communication interface 205 may comprise I/O interface which may be in the form of a GUI, a touch interface, a voice enabled interface, a keypad and the like. For example, the communication interface 205 may be a touch enabled interface of a navigation device installed in a vehicle, which may also display various navigation related data to the user of the vehicle. Such navigation related data may include information about upcoming conditions on a route, route display and alerts about lane maintenance, turn-maneuvers, vehicle speed, and the like.

FIG. 3A illustrates a first exemplary working environment 300a of the system 101 for updating the linear traffic feature data, in accordance with one or more example embodiments. As illustrated in FIG. 3A, the first working environment 300a includes the system 101, the mapping platform 103, the network 105, a vehicle 301, a link 303, a link 305, a link 307, a linear traffic feature 309 associated with the link 303, a linear traffic feature 311 associated with the link 305, and a linear traffic feature 313 associated with the link 307. The vehicle 301 may include a motor vehicle, a non-motor vehicle, an automobile, a car, a scooter, a truck, a van, a bus, a motorcycle, a bicycle, a Segway, and/or the like. The vehicle 301 may be an autonomous vehicle, a semi-autonomous vehicle, or a manual vehicle. As used herein, the autonomous vehicle may be a vehicle that is capable of sensing its environment and operating without human involvement. For instance, the autonomous may be a self-driving car and the like.

As used herein, the 'link' (e.g. the link 303, the link 305, and the link 307) may be a road segment between two nodes. Each of the links 303, 305, and 307 may comprise one or more lanes. The link 303 may be a freeway, an expressway, a highway, and the like. The link 305 may also be the freeway, the expressway, the highway, and the like connected to the link 303. For example, the link 305 may be propagated from the link 303. The link 307 may be an exit-ramp link connected to the link 303. The link 307 allows the vehicle 301 to exit the freeway, the expressway, the highway, and the like. Alternatively, the link 307 may be an entrance ramp link (also referred to as a merging link) that allows one or more vehicles to enter the freeway, the expressway, the highway, and the like.

As used herein, the 'linear traffic feature' (e.g., the linear traffic feature 309, the linear traffic feature 311, and the linear traffic feature 313) may include one or more borders corresponding to a respective link (e.g., the link 303, the link 305, and the link 307) and/or may include a border of a lane or lane markings corresponding to the respective link. For instance, the linear traffic feature 309, the linear traffic feature 311, and the linear traffic feature 313 may include, but are not limited to, at least one of the lane markings, the guardrails, the road curbs, the road medians, and the road barriers on the links 303, 305, and 307 respectively. The linear traffic features 309, 311, and 313 may be used to assist the vehicle 301 in a vehicle navigation. For instance, the linear traffic features 309, 311, and 313 may be used in maintaining a lane on the links 303, 305, and 307 respectively.

To this end, in some embodiments, the vehicle 301 may be equipped with various sensors to capture the linear traffic features 309, 311, and 313 for assisting the vehicle 301 in the vehicle navigation. For instance, the sensors of the vehicle 301 may include a radar system, a LiDAR system, a global positioning sensor for gathering location data (e.g., GPS), image sensors, temporal information sensors, orientation sensors augmented with height sensors, tilt sensors, and the like. In some example embodiments, the sensors of the vehicle 301 may collect the linear traffic features 309, 311, and 313 as linear traffic feature points, leading to the linear traffic feature data. In these embodiments, sensor data obtained from the sensors include the linear traffic feature data, among other things. For instance, each linear traffic feature point in the linear traffic feature data may represent image data corresponding to at least one of the linear traffic features 309, 311, and 313.

However, in most of cases, the sensors of the vehicle 301 may fail to continuously capture the linear traffic features 309, 311, and 313 along the links 303, 305, and 307 respectively, leading to discontinuities in the linear traffic feature data. For instance, the sensors of the vehicle 301 may fail to continuously capture the linear traffic features 309, 311, and 313, due to occlusions (caused by interference of other vehicles), noise in the sensors, or other defects in the sensors. In other words, the discontinuities in the linear traffic feature data may occur when the sensors fail to completely capture the linear traffic features 309, 311, and 313 along the links 303, 305, and 307 respectively. As a result, a gap may be formed between any two consecutive linear traffic feature points in the linear traffic feature data. As used herein, the gap between any two consecutive linear traffic feature points may be indicative of a distance of discontinuity. Hereinafter, the 'discontinuities in the linear traffic feature data' and 'discontinuous linear traffic feature data' may be interchangeably used to mean the same.

Some embodiments are based on the realization that when the distance of discontinuity between any two consecutive linear traffic feature points is greater than a threshold distance, the gap between the two discontinuous linear traffic feature points should not be filled to represent the at least one of the linear traffic features 309, 311, and 313 along the links 303, 305, and 307 respectively, due to at least one of a curvature nature of the links 303, 305, and 307 and/or a presence of an intersection between the links 303, 305, 307. The threshold distance may be determined by experimentation and the like. Accordingly, the linear traffic feature data extracted from the sensor data may not be accurate to provide the vehicle navigation, when the linear traffic feature data corresponds to the discontinuous linear traffic feature data. Further, if the discontinuous linear traffic feature data is used in the vehicle navigation, the vehicle 301 may end-up with unwanted conditions such as entering a wrong lane, road accidents, traffic congestions, vehicle efficiency reduction, environmental pollutions, and the like. To this end, when the linear traffic feature data corresponds to the discontinuous linear traffic feature data, the system 101 is provided for updating the linear traffic feature data such that the unwanted conditions are avoided. Further, to update the linear traffic feature data, the system 101 may be configured as explained in the detailed description of FIG. 3B-FIG. 3D.

FIG. 3B illustrates a schematic 300b for determining matched headings, in accordance with one or more example embodiments. As illustrated in FIG. 3B, the schematic 300b may include the link 303, the link 305, a plurality of locations 315a, 315b, 315c, 315d, and 315e associated with the link 303, a plurality of locations 317a, 317b and 317c associated with the link 305, linear traffic feature data 319, and matched headings 321a, 321b, 321c, and 321d. In various embodiments, the system 101 may be configured to receive, from the sensors, the sensor data while traveling on the link 303. For instance, the reception module 201a may be configured to receive, from the sensors, the sensor data. In some example embodiments, the sensor data may include vehicle location data and the linear traffic feature data 319. In some other example embodiments, the sensor data may include only the vehicle location data. The vehicle location data may be indicative of at least one location of the vehicle 301 on the link 303. When the sensor data include the vehicle location data and the linear traffic feature data 319, the system 101 may be configured to map-match the vehicle location data with the map data of the map database 103a to identify a matched link. For instance, the traffic feature determination module 201b may be configured to map-match the vehicle location data with the map data to identify the matched link. For instance, the system 101 may identify the link 303 as the matched link, because the vehicle 301 is traveling on the link 303. In other words, since the vehicle location data indicates that the vehicle 301 is traveling the link 303, the system 101 may determine, from the map data, the link 303 as the matched link. Further, the system 101 may be configured to determine, from the sensor data, the linear traffic feature data 319 associated with the matched link 303. For instance, the traffic feature determination module 201b may be configured to extract the linear traffic feature data 319 included in the sensor data as the linear traffic feature data 319 associated with the matched link 303.

When the sensor data includes only the vehicle location data, the system 101 may be configured to map-match the vehicle location data with the map data of the map database 103a to identify the matched link (e.g. the link 303). Further, the system 101 may be configured to determine, using the map data of the map database 103a, the linear traffic feature data 319 associated with the matched link, if the map data includes the linear traffic feature data 319 associated with the link 303. For instance, the traffic feature determination module 201b may be configured to determine, using the map data, the linear traffic feature data 319 associated with the matched link.

In various embodiments, the linear traffic feature data 319 may include a plurality of linear traffic feature points 319a, 319b . . . , 319n. Each of the plurality of linear traffic feature points 319a, 319b . . . , 319n may correspond to data (e.g., the image data) indicative of the linear traffic feature 309 associated with the link 303. Additionally, each of the plurality of linear traffic feature points 319a, 319b . . . , 319n may include location data. The location data may be indicative of a location of the linear traffic feature 309.

In various embodiments, the system 101 may configured to determine a status of the linear traffic feature data 319. For instance, the heading data generation module 201c may be configured to determine the status of the linear traffic feature data 319. In various embodiments, the system 101 may determine the status of the linear traffic feature data 319 as at least one of the discontinuous linear traffic feature data or continuous linear traffic feature data. The system 101 may determine the status of the linear traffic feature data 319 as the discontinuous linear traffic feature data, when a distance between any two consecutive linear traffic feature points of the plurality of linear traffic feature points 319a, 319b . . . , 319n is greater than the threshold distance. Alternatively, the system 101 may determine the status of the linear traffic feature data 319 as the continuous linear traffic feature data, when a distance between all two consecutive linear traffic feature points of the plurality of linear traffic feature points 319a, 319b . . . , 319n is lesser than the threshold distance.

In various embodiments, the system 101 may be configured to generate heading data based on the linear traffic feature data 319, in response determining the status of the linear traffic feature data 319 as the discontinuous linear traffic feature data. For instance, the heading data generation module 201c may be configured to generate the heading data based on the linear traffic feature data 319. In various embodiments, for generating the heading data, the system 101 may be configured to determine a second link connected to the matched link (e.g. the link 303). In some example embodiments, the system 101 may determine the second link connected to the matched link, based on a route (or path) selected by the user. For instance, the system 101 may determine, from the links 305 and 307 (shown in FIG. 3A), the link 305 as the second link, based on the route (or path) selected by the user. For instance, the user may include a traveler, a driver, and the like.

In various embodiments, the system 101 may be configured to extract, from the map data, the plurality of locations 315a, 315b, 315c, 315d, and 315e associated with the matched link (e.g., the link 303) and the plurality of locations 317a, 317b, and 317c associated with the second link (e.g., the link 305). In the plurality of locations 315a, 315b, 315c, 315d, and 315e, the locations 315a and 315e may correspond to the endpoints of the link 303 and the locations 315a, 315b, and 315c may correspond to the shape locations of the link 303. Similarly, in the plurality of locations 317a, 317b, and 317c, the locations 317a and 317b may correspond to the endpoints of the link 305 and the location 317b may correspond to the shape location of the link 305.

In various embodiments, the plurality of shape locations 315b, 315c, and 315d may be used to define a curvature nature of the link 303. For instance, the plurality of shape locations 315b, 315c, and 315d may divide the link 303 into a plurality of sub links 303a, 303b, 303c and 303d to capture the curvature nature of the link 303. The shape location 317b may be used to define a curvature nature of the link 305. For instance, the shape location 317b may divide the link 305 into a plurality of sub links 305a and 305b to capture the curvature nature of the link 305. In various embodiments, the system 101 may be configured to determine, from the plurality of locations 315a, 315b, 315c, 315d, and 315e, the plurality of shape locations 315b, 315c, and 315d associated with the match link (e.g. the link 303). In some embodiments, the system 101 may directly determine, from the map data, the plurality of shape locations 315b, 315c, and 315d associated with the matched link. Similarly, the system 101 may determine at least one shape location 317b associated with the second link. Here for purpose of explanation, the link 303 comprising three shape locations 315b, 315c, and 315d and the link 305 comprising the shape location 317b are considered. However, the link 303 and the link 305 may comprise any finite number of shape locations without deviating from the scope of the invention.

In various embodiments, the system 101 may be configured to determine at least one matched heading between the plurality of shape locations 315b, 315c, and 315d associated with the matched link. For example, the system 101 may determine the matched heading 321a between the shape locations 315b and 315c and the matched heading 321b between the shape locations 315c and 315d. According to some embodiments, the system 101 may determine the matched heading 321a between the shape locations 315b and 315c and the matched heading 321b between the shape locations 315c and 315d, because the discontinuity in the linear traffic feature data 319 starts after the shape location 315b. In some example embodiments, the system 101 may determine a heading associated with the sub link 303b as the matched heading 321a and a heading associated with the sub link 303c as the matched heading 321b. In various embodiments, the system 101 may extract, from the map data, the heading associated with the sub link 303b and the heading associated with the sub link 303c.

Additionally, in some embodiments, the system 101 may be further configured to determine at least one matched heading between the plurality of shape locations 315b, 315c, and 315d associated with the matched link and the shape location 317b associated with the second link. For example, the system 101 may determine the matched heading 321c between the locations 315d and 315e and the matched heading 321d between the locations 317a and 317b. In some example embodiments, the system 101 may determine a heading associated with the sub link 303d as the matched heading 321c and a heading associated with the sub link 305a as the matched heading 321d. As used herein, the 'heading' (e.g. the heading associated with the sub link 303b, the heading associated with the sub link 303c, the heading associated with the sub link 303d, the heading associated with the sub link 305a) may be an angle measured relative to a north direction, a line-of-sight direction, or the like.

In various embodiments, the system 101 may be configured to determine the location data associated with the linear traffic feature data 319. For instance, the system 101 may extract the location data included in the linear traffic feature data 319. In various embodiments, the system 101 may be configured to identify a side of the linear traffic feature data 319 with respect to the matched link, based on the determined location data and one or more of the matched heading 321a, the matched heading 321b, the matched heading 321c, and the matched heading 321d. In various embodiments, the system 101 may identify the side of the linear traffic feature data 319 with respect to the matched link as at least one of a right-side with respect to the matched link or a left-side with respect to the matched link. For instance, with reference to FIG. 3B, the system 101 may identify the side of the linear traffic feature data 319 as the left-side with respect to the matched link, based on the determined location data and one or more of the matched heading 321a, the matched heading 321b, the matched heading 321c, and the matched heading 321d.

In various embodiments, the system 101 may be configured to generate the heading data, based on the identified side of the linear traffic feature data 319. For instance, the heading data generation module 201c may be configured to generate the heading data, based on the identified side of the linear traffic feature data 319. For instance, to generate the heading data based on the identified side of the linear traffic feature data 319, the system 101 may be configured as explained in the detailed description of FIG. 3C.

FIG. 3C illustrates a schematic 300c for determining the heading data, in accordance with one or more example embodiments. As illustrated in FIG. 3C, the schematic 300c may include the link 303, the link 305, the plurality of locations 315a, 315b, 315c, 315d, and 315e associated with the link 303, the plurality of locations 317a, 317b and 317c associated with the link 305, the sub links 303a, 303b, 303c, and 303d, the sub links 305a and 305b, heading data 323a and 323b, a distance 325, and derived locations 327a and

327b. In various embodiments, the system 101 may be configured to generate the heading data 323a and 323b, based on the identified side of the linear traffic feature data 319. For instance, with reference to FIG. 3C, the system 101 may generate the heading data 323a and 323b on the left-side with respect to the matched link, because the side of the linear traffic feature data 319 is identified as the left-side with respect to the matched link. In various embodiments, for generating the heading data 323a and 323b, the system 101 may drop one or more perpendiculars to the matched link. For instance, the system 101 may generate the heading data 323a by dropping the perpendicular to the sub link 303b. Similarly, the system 101 may generate the heading data 323b by dropping the perpendicular to the sub link 303c. According to some embodiments, the system 101 may drop the perpendiculars to the sub links 303b and 303c to generate the heading data 323a and 323b respectively, as the matched headings 321a and 321b are determined for the sub links 303b and 303c. In some embodiments, the heading data 323a may be an angle measured between the north direction (or the line-of-sight direction) and the perpendicular dropped to the sub link 303b. In some embodiments, the heading data 323b may be an angle measured between the north direction (or the line-of-sight direction) and the perpendicular dropped to the sub link 303c.

In various embodiments, the system 101 may be configured to update the linear traffic feature data 319, based on the generated heading data 323a and 323b. For instance, the updating module 321d may be configured to update the linear traffic feature data 319, based on the generated heading data 323a and 323b. In various embodiments, for updating the linear traffic feature data 319, the system 101 may be configured to determine the derived locations 327a and 327b along the generated heading data 323a and 323b, respectively.

For determining the derived locations 327a and 327b, the system 101 may be configured to identify a distance 325 (also referred to as a point-to-line distance 325) between the linear traffic feature data 319 and the matched link. For instance, the system 101 may identify the distance 325 between the location data associated with the linear traffic feature data 319 and a line (e.g. a vector) representing the matched link. Further, the system 101 may be configured to identify a link deviation location. For instance, the system 101 may identify the shape location 315c between the sub links 303b and 303c as the link deviation location, as the heading data 323a and 323b are generated with respect to the sub links 303b and 303c respectively. Furthermore, the system 101 may be configured to determine the derive locations 327a and 327b along the generated heading data 323a and 323b, based on the distance 325 and the link deviation location (e.g. the shape location 315c). In some embodiments, the derived location 327a may be located at the distance 325, from the line (e.g. the vector) representing the matched link (specifically, the sub link 303b) and/or from the link deviation location, along the heading data 323a. Similarly, the derived location 327b may be located at the distance 325, from the line (e.g. the vector) representing the matched link (specifically, the sub link 303c) and/or from the link deviation location, along the heading data 323b. In various embodiments, the system 101 may further use the derived location 327a and 327b to update the linear traffic feature data 319. For instance, to update the linear traffic feature data 319 using the derived location 327a and 327b, the system 101 may be configured as explained in the detailed description of FIG. 3D.

FIG. 3D illustrates a schematic 300d for updating the linear traffic feature data 319, in accordance with one or more example embodiments. As illustrated in FIG. 3D, the schematic 300d may include the link 303, the link 305, the heading data 323a and 323b, the derived locations 327a along the heading data 323a, the derived location 327b along the heading data 323b, linear traffic feature lines 329a and 329b, and a linear traffic feature location 331. In various embodiments, for updating the linear traffic feature data 319, the system 101 may be configured to determine the linear traffic feature location 331, based on the derived locations 327a and 327b. For determining the linear traffic feature location 331, the system 101 may be configured to generate the linear traffic feature line 329a, such as by extending the linear traffic feature data 319 till the derived location 327a and further extending it parallelly. Similarly, the system 101 may be configured to generate the linear traffic feature line 329b till the derived location 327b and further extending it parallelly. In some embodiments, the system 101 may generate the linear traffic feature line 329a at the derived location 327a such that the linear traffic feature line 329a is parallel to the matched link (specifically, the sub link 303b). Similarly, the system 101 may generate the linear traffic feature line 329b at the derived location 327b such that the linear traffic feature line 329b is parallel to the matched link (specifically, the sub link 303c). Further, the system 101 may be configured to identify an intersection location between the linear traffic feature lines 329a and 329b. For instance, the intersection location may be a location where the linear traffic feature lines 329a and 329b meet or intersect. Furthermore, the system 101 may be configured to determine the intersection location as the linear traffic feature location 331.

In various embodiments, the system 101 may use the linear traffic feature location 331 to update the linear traffic feature data 319. For instance, the system 101 may fill a gap between the linear traffic feature location 331 and the linear traffic feature data 319 to update the linear traffic feature data 319. The updated the linear traffic feature data 319 associated with the matched link (e.g. the link 303) may represent the complete linear traffic feature 309 associated with the link 303 without any discontinuities. Further, in some example embodiments, the system 101 may be configured to update the map data of the map database 103a to include the updated the linear traffic feature data 319 for the matched link. Furthermore, in some embodiments, the system 101 may be configured to use the updated the linear traffic feature data 319 and/or the updated map data to provide one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

In this way, when the linear traffic feature data 319 corresponds to the discontinuous linear traffic feature data, the system 101 may update the linear traffic feature data 319 such that the unwanted conditions are avoided. For instance, the unwanted conditions may include entering a wrong lane, road accidents, traffic congestions, vehicle efficiency reduction, environmental pollutions, and the like.

For purpose of explanation, in FIG. 3A-FIG. 3D, the links 303, 305, and 307 having curved road geometries are considered. For instance, links may also have straight road geometries. Further, when the links are straight, the system 101 may update the linear traffic feature as explained in the detailed description of FIG. 4A.

FIG. 4A illustrates a second exemplary working environment 400a of the system 101 for updating the linear traffic feature data, in accordance with one or more example embodiments. As illustrated in FIG. 4A, the second working environment 400a includes the system 101, the mapping platform 103, the network 105, a vehicle 401, a link 403, a link 405, a link 407, a linear traffic feature 409 associated with the link 403, a linear traffic feature 411 associated with the link 405, and a linear traffic feature 413 associated with the link 407. The vehicle 401 may correspond to the vehicle 301.

Each of the links 403, 405, and 407 may comprise one or more lanes. The link 403 may be a freeway, an expressway, a highway, and the like. The link 405 may also be the freeway, the expressway, the highway, and the like connected to the link 403. For example, the link 405 may be propagated from the link 403. The link 407 may be an exit-ramp link connected to the link 403. Alternatively, the link 407 may be an entrance ramp link (also referred to as a merging link) connected to the link 403.

As used herein, the 'linear traffic feature' (e.g. the linear traffic feature 409, the linear traffic feature 411, and the linear traffic feature 413) may be a border corresponding to a respective link (e.g. the link 403, the link 405, and the link 407) or may be a border of a lane corresponding to the respective link. For instance, the linear traffic feature 409, the linear traffic feature 411, and the linear traffic feature 413 may include, but are not limited to, at least one of the lane markings, the guardrails, the road curbs, the road medians, and the road barriers on the links 403, 405, and 407 respectively. The linear traffic features 409, 411, and 413 may be used to assist the vehicle 401 in the vehicle navigation.

To this end, in some embodiments, the vehicle 401 may be equipped with various sensors to capture the linear traffic features 409, 411, and 413 for assisting the vehicle 401 in the vehicle navigation. In some example embodiments, the sensors of the vehicle 401 may collect the linear traffic features 409, 411, and 413 as the linear traffic feature points, leading to the linear traffic feature data. In these embodiments, sensor data obtained from the sensors include the linear traffic feature data, among other things. For instance, each linear traffic feature point in the linear traffic feature data may represent the image data corresponding to at least one of the linear traffic features 409, 411, and 413.

However, in most of cases, the sensors of the vehicle 401 may fail to continuously capture the linear traffic features 409, 411, and 413 along the links 403, 405, and 407 respectively, leading to discontinuities in the linear traffic feature data. For instance, the sensors of the vehicle 401 may fail to continuously capture the linear traffic features 409, 411, and 413, due to occlusions (caused by interference of other vehicles), noise in the sensors, or other defects in the sensors. In other words, the discontinuities in the linear traffic feature data may occur when the sensors fail to completely capture the linear traffic features 409, 411, and 413 along the links 403, 405, and 407 respectively. As a result, a gap may be formed between any two consecutive linear traffic feature points in the linear traffic feature data. As used herein, the gap between any two consecutive linear traffic feature points may be indicative of a distance of discontinuity. Hereinafter, the 'discontinuities in the linear traffic feature data' and 'discontinuous linear traffic feature data' may be interchangeably used to mean the same.

Some embodiments are based on the realization that when the distance of discontinuity between any two consecutive linear traffic feature points is greater than the threshold distance, the gap between the two discontinuous linear traffic feature points should not be filled to represent the at least one of the linear traffic features 409, 411, and 413 along the links 403, 405, and 407 respectively, due to the presence of an intersection between the links 403, 405, 407. The threshold distance may be determined by experimentation and the like. Accordingly, the linear traffic feature data extracted from the sensor data may not be accurate to provide the vehicle navigation, when the linear traffic feature data corresponds to the discontinuous linear traffic feature data. Further, if the discontinuous linear traffic feature data is used in the vehicle navigation, the vehicle 401 may end-up with unwanted conditions such as entering a wrong lane, road accidents, traffic congestions, vehicle efficiency reduction, environmental pollutions, and the like. To this end, when the linear traffic feature data corresponds to the discontinuous linear traffic feature data, the system 101 is provided for updating the linear traffic feature data such that the unwanted conditions are avoided. Further, to update the linear traffic feature data, the system 101 may be configured as explained in the detailed description of FIG. 4B-FIG. 4D.

FIG. 4B illustrates a schematic 400b for determining matched headings, in accordance with one or more example embodiments. As illustrated in FIG. 4B, the schematic 400b may include the link 403, the link 407, a plurality of locations 415a and 415b associated with the link 403, a plurality of locations 417a and 417b associated with the link 407, linear traffic feature data 419, and matched headings 421a and 421b. In various embodiments, the system 101 may be configured to receive, from the sensors, the sensor data while traveling on the link 403. In some example embodiments, the sensor data may include the vehicle location data and the linear traffic feature data 419. In some other example embodiments, the sensor data may include only the vehicle location data. The vehicle location data may be indicative of at least one location of the vehicle 401 on the link 403. When the sensor data include the vehicle location data and the linear traffic feature data 419, the system 101 may be configured to map-match the vehicle location data with the map data of the map database 103a to identify the matched link. For instance, the system 101 may identify the link 403 as the matched link, because the vehicle 401 is traveling on the link 403. Further, the system 101 may be configured to determine, from the sensor data, the linear traffic feature data 419 associated with the matched link.

When the sensor data includes only the vehicle location data, the system 101 may be configured to map-match the vehicle location data with the map data of the map database 103a to identify the matched link (e.g. the link 403). Further, the system 101 may be configured to determine, using the map data, the linear traffic feature data 419 associated with the matched link, if the map data includes the linear traffic feature data 419 associated with the link 403.

In various embodiments, the linear traffic feature data 419 may include a plurality of linear traffic feature points 419a. Each of the plurality of linear traffic feature points 419a may correspond to data (e.g. the image data) indicative of the linear traffic feature 409 associated with the link 403. Additionally, each of the plurality of linear traffic feature points 419a may include the location data.

In various embodiments, the system 101 may configured to determine the status of the linear traffic feature data 419. In various embodiments, the system 101 may determine the status of the linear traffic feature data 419 as at least one of the discontinuous linear traffic feature data or the continuous linear traffic feature data. The system 101 may determine the status of the linear traffic feature data 419 as the discontinuous linear traffic feature data, when the distance between any two consecutive linear traffic feature points of the plurality of linear traffic feature points 419a is greater than the threshold distance. Alternatively, the system 101 may determine the status of the linear traffic feature data 419 as the continuous linear traffic feature data, when the distance between all two consecutive linear traffic feature points of the plurality of linear traffic feature points 419a is lesser than the threshold distance.

In various embodiments, the system 101 may be configured to generate heading data based on the linear traffic feature data 419, in response determining the status of the linear traffic feature data 419 as the discontinuous linear traffic feature data. In various embodiments, for generating the heading data, the system 101 may be configured to determine a second link connected to the matched link. In some example embodiments, the system 101 may determine the second link connected to the matched link, based on the route (or path) selected by the user. For instance, the system 101 may determine, from the links 405 and 407, the link 407 as the second link, based on the route (or path) selected by the user.

In various embodiments, the system 101 may be configured to extract, from the map data, the plurality of locations 415a and 415b associated with the match link (e.g. the link 403) and the plurality of locations 417a and 417b associated with the second link (e.g. the link 407). The plurality of locations 415a and 415b may correspond to the endpoints of the link 403. Similarly, the plurality of locations 417a and 417b may correspond to the endpoints of the link 407. In some cases, the location 415b and the location 417a may be same and further may indicate a ramp intersection.

In various embodiments, the system 101 may be configured to determine at least one matched heading between the plurality of locations 415a and the 415b associated with the matched link and the plurality of locations 417a and the 417b associated with the second link. For example, the system 101 may determine the matched heading 421a between the locations 415a and 415b and the matched heading 421b between the locations 417a and 417b. In some example embodiments, the system 101 may determine a heading associated with the link 403 as the matched heading 421a and a heading associated with the link 407 as the matched heading 421b. In various embodiments, the system 101 may extract, from the map data, the heading associated with the link 403 and the heading associated with the link 407. As used herein, the 'heading' (e.g. the heading associated with the link 403 and the heading associated with the link 407) may be an angle measured relative to a north direction, a line-of-sight direction, or the like.

In various embodiments, the system 101 may be configured to determine the location data associated with the linear traffic feature data 419. For instance, the system 101 may extract the location data included in the linear traffic feature data 419. In various embodiments, the system 101 may be configured to identify the side of the linear traffic feature data 419 with respect to the matched link, based on the determined location data and one or more of the matched heading 421a and the matched heading 421b. In various embodiments, the system 101 may identify the side of the linear traffic feature data 419 with respect to the matched link as at least one of the right-side with respect to the matched link or the left-side with respect to the matched link. For instance, with reference to FIG. 4B, the system 101 may identify the side of the linear traffic feature data 419 as the left-side with respect to the matched link, based on the determined location data and one or more of the matched heading 421a and the matched heading 421b.

In various embodiments, the system 101 may be configured to generate the heading data, based on the identified side of the linear traffic feature data 419. For instance, to generate the heading data based on the identified side of the linear traffic feature data 419, the system 101 may be configured as explained in the detailed description of FIG. 4C.

FIG. 4C illustrates a schematic 400c for determining the heading data, in accordance with one or more example embodiments. As illustrated in FIG. 4C, the schematic 400c may include the link 403, the link 407, the plurality of locations 415a and 415b associated with the link 403, the plurality of locations 417a and 417b associated with the link 407, heading data 423a and 423b, a distance 425, and derived locations 427a and 427b. In various embodiments, the system 101 may be configured to generate the heading data 423a and 423b, based on the identified side of the linear traffic feature data 419. For instance, with reference to FIG. 3C, the system 101 may generate the heading data 423a and 423b on the left-side with respect to the matched link, because the side of the linear traffic feature data 419 is identified as the left-side with respect to the matched link. In various embodiments, for generating the heading data 423a and 423b, the system 101 may drop a perpendicular to the matched link and a perpendicular to the second link. For instance, the system 101 may generate the heading data 423a by dropping the perpendicular to the link 403. Similarly, the system 101 may generate the heading data 423b by dropping the perpendicular to the link 407.

In various embodiments, the system 101 may be configured to update the linear traffic feature data 419, based on the generated heading data 423a and 423b. In various embodiments, for updating the linear traffic feature data 419, the system 101 may be configured to determine the derived locations 427a and 427b along the generated heading data 423a and 423b, respectively.

For determining the derived locations 427a and 427b, the system 101 may be configured to identify the distance 425 (also referred to as a point-to-line distance 425) between the linear traffic feature data 419 and the matched link. For instance, the system 101 may identify the distance 425 between the location data associated with the linear traffic feature data 419 and a line (e.g. a vector) representing the matched link. Further, the system 101 may be configured to identify the link deviation location. For instance, the system 101 may identify at least one of the locations 415a and 417b between the matched link and the second link as the link deviation location. In some embodiments, the location 415b and the location 417a may be same. Furthermore, the system 101 may be configured to determine the derived locations 427a and 427b along the generated heading data 423a and 423b, based on the distance 425 and the link deviation location. In some embodiments, the derived location 427a may be located at the distance 425, from the line (e.g. the vector) representing the matched link and/or from the link deviation location, along the heading data 423a. Similarly, the derived location 427b may be located at the distance 425, from the line (e.g. the vector) representing the second link and/or from the link deviation location, along the heading data 423*b*. As used herein, the link deviation location may correspond to at least one of the shape location between the sub links and/or the node between the links, which is an origin for determining the derived locations. In various embodiments, the system 101 may further use the derived location 427*a* and 427*b* to update the linear traffic feature data 419. For instance, to update the linear traffic feature data 419 using the derived location 427*a* and 427*b*, the system 101 may be configured as explained in the detailed description of FIG. 4D.

FIG. 4D illustrates a schematic 400*d* for updating the linear traffic feature data 419, in accordance with one or more example embodiments. As illustrated in FIG. 4D, the schematic 400*d* may include the link 403, the link 407, the heading data 423*a* and 423*b*, the derived locations 427*a* along the heading data 423*a*, the derived location 427*b* along the heading data 423*b*, linear traffic feature lines 429*a* and 429*b*, and a linear traffic feature location 431. In various embodiments, for updating the linear traffic feature data 419, the system 101 may be configured to determine the linear traffic feature location 431, based on the derived locations 427*a* and 427*b*. For determining the linear traffic feature location 431, the system 101 may be configured to generate the linear traffic feature line 429*a* at the derived location 427*a* and generate the linear traffic feature line 429*b* at the derived location 427*b*. In some embodiments, the system 101 may generate the linear traffic feature line 429*a* at the derived location 427*a* such that the linear traffic feature line 429*a* is parallel to the matched link. Similarly, the system 101 may generate the linear traffic feature line 429*b* at the derived location 427*b* such that the linear traffic feature line 429*b* is parallel to the second link. Further, the system 101 may be configured to identify an intersection location between the linear traffic feature lines 429*a* and 429*b*. For instance, the intersection location may be a location where the linear traffic feature lines 429*a* and 429*b* meet or intersect. Furthermore, the system 101 may be configured to determine the intersection location as the linear traffic feature location 431.

In various embodiments, the system 101 may use the linear traffic feature location 431 to update the linear traffic feature data 419. For instance, the system 101 may fill a gap between the linear traffic feature location 431 and the linear traffic feature data 419 to update the linear traffic feature data 419. The updated the linear traffic feature data 419 associated with the matched link may represent the complete linear traffic feature 409 associated with the link 403 without any discontinuities. Further, in some example embodiments, the system 101 may be configured to update the map data of the map database 103*a* to include the updated the linear traffic feature data 419 for the matched link. Furthermore, in some embodiments, the system 101 may be configured to use the updated the linear traffic feature data 419 and/or the updated map data to provide one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

In this way, when the linear traffic feature data 419 corresponds to the discontinuous linear traffic feature data, the system 101 may update the linear traffic feature data 419 such that the unwanted conditions are avoided. For instance, the unwanted conditions may include entering a wrong lane, road accidents, traffic congestions, vehicle efficiency reduction, environmental pollutions, and the like.

FIG. 5A illustrates a flowchart depicting a method 500*a* for updating the linear traffic feature data, in accordance with one or more example embodiments. It will be understood that each block of the flow diagram of the method 500*a* may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 500*a* support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Starting at block 501, the method 500*a* may include determining, from the sensor data, the linear traffic feature data 319 associated with the matched link (e.g. the link 303). For instance, the traffic feature determination module 201*b* may determine, from the sensor data, the linear traffic feature data 319 associated with the matched link as explained in the detailed description of FIG. 3B.

At block 503, the method 500*b* may include generating the heading data 323*a* and 323*b* based on the linear traffic feature data 319. For instance, the heading data generation module 201*c* may be configured to generate the heading data 323*a* and 323*b* based on the linear traffic feature data 319. In some example embodiments, the generation of the heading data 323*a* and 323*b* may comprise dropping one or more perpendicular to the match link. Further, the heading data 323*a* and 323*b* may be generated as explained in the detailed description of FIG. 5B.

FIG. 5B illustrates a flowchart depicting a method 500*b* for generating the heading data 323*a* and 323*b*, in accordance with one or more example embodiments. The method 500*b* may be used in conjunction with the system 101 described in the detailed description of FIG. 3B-FIG. 3C. Although various blocks of method 500*b* are described below and depicted in FIG. 5B, the blocks need not necessarily all be executed, and in some cases may be executed in a different order than the order shown.

Starting at block 503*a*, the method 500*b* may include determining the plurality of shape locations associated with at least one of the matched link (e.g. the link 303) and the second link (e.g. the link 305). For instance, the system 101 may determine the plurality of shape locations 315*b*, 315*c*, and 315*d* associated with the link 303 and the shape location 317*b* associated with the link 305.

At block 503*b*, the method 500*b* may include determining one or more of the at least one matched heading between the plurality of shape locations associated with the matched link or the at least one matched heading between the plurality of shape locations associated with the matched link and the plurality of shape locations associated with second link. For instance, the system 101 may determine one or more of the matched headings 321*a* and 321*b* or the matched headings 321*c* and 321*d*.

At block 503*c*, the method 500*b* may include determining the location data associated with the linear traffic feature data 319. For instance, the system 101 may determine the location data included in the linear traffic feature data 319.

At block 503*d*, the method 500*b* may include identifying the side of the linear traffic feature data 319 with respect to the matched link, based on the determined location data and one or more of the at least one matched heading between the plurality of shape locations associated with the matched link or the at least one matched heading between the plurality of shape locations associated with the matched link and the plurality of shape locations associated with the second link. For instance, the system 101 may identify the side of the linear traffic feature data with respect to the matched link, based on the determined location data and one or more of the matched headings 321*a* and 321*b* or the matched headings 321*c* and 321*d*. In some example embodiments, the side of the linear traffic feature data 319 may be identified as at least one of the right-side with respect to the matched link or the left-side with respect to the matched link.

At block 503*e*, the method 500*b* may include generating the heading data 323*a* and 323*b*, based on the identified side of the linear traffic feature data 319. For instance, the system 101 may drop the perpendiculars to the sub links 303*b* and 303*c* on either of the right-side with respect to the matched link or the left-side with respect to the matched link to generate the heading data 323*a* and 323*b* respectively, based on the identified side of the linear traffic feature data 319.

Once the heading data 323*a* and 323*b* is generated, the method 500*b* may continue with block 505 of the method 500*a*. At block 505, the method 500*a* may include updating the linear traffic feature data 319, based on the generated heading data 323*a* and 323*b*. For instance, the updating module 201*d* may update the linear traffic feature data 319, based on the generated heading data 323*a* and 323*b*. In some example embodiments, for include updating the linear traffic feature data 319, the method 500*a* may further include determining the derived locations 327*a* and 327*b* along the generated heading data 323*a* and 323*b* respectively; and determining the linear traffic feature location 431, based on the determined derived locations 327*a* and 327*b*.

On implementing the method 500*a* and the method 500*b* disclosed herein, the system 101 may be configured to update the linear traffic feature data 319 when the linear traffic feature data 319 corresponds to the discontinuous linear traffic feature data such that the unwanted conditions are avoided. Further, in some embodiments, the system 101 may be further configured to update the map data to include the updated linear traffic feature data. Furthermore, the system 101 may be configured to provide the one or more navigation functions using at least one of the updated linear traffic feature data and/or the updated map data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system for updating linear traffic feature data, the system comprising:
    a memory configured to store computer-executable instructions; and
    at least one processor configured to execute the computer-executable instructions to:
        determine, from sensor data, the linear traffic feature data associated with a matched link;
        generate heading data based on the linear traffic feature data, wherein the generation of the heading data comprises dropping a first perpendicular to the matched link and a second perpendicular to a second link connected to the matched link;
        determine a first derived location along the first perpendicular and a second derived location along the second perpendicular;
        determine a linear traffic feature location based on the first and second derived locations; and
        update the linear traffic feature data to include the linear traffic feature location.

2. The system of claim 1, wherein to generate the heading data, the at least one processor is further configured to:
    determine location data associated with the linear traffic feature data;
    identify a side of the linear traffic feature data with respect to the matched link, based on the location data; and
    generate the heading data, based on the side of the linear traffic feature data.

3. The system of claim 2, wherein to generate the heading data, the at least one processor is further configured to:
    determine a plurality of shape locations associated with at least one of the matched link and the second link;
    determine one or more of at least one matched heading between the plurality of shape locations associated with the matched link or at least one matched heading between the plurality of shape locations associated with the matched link and the plurality of shape locations associated with second link;
identify the side of the linear traffic feature data with respect to the matched link, based on the location data and one or more of the at least one matched heading between the plurality of shape locations associated with the matched link or the at least one matched heading between the plurality of shape locations associated with the matched link and the plurality of shape locations associated with the second link; and
generate the heading data, based on the side of the linear traffic feature data.

4. The system of claim 1, wherein to determine the first derived location along the first perpendicular and the second derived location along the second perpendicular, the at least one processor is further configured to:
identify a distance between the linear traffic feature data and the matched link; and
determine each of the first derived location and the second dervied location based on the distance and a link deviation location, wherein the link deviation location is an origin for determining the first derived location and the second derived location.

5. The system of claim 1, wherein to determine the linear traffic feature location, the at least one processor is further configured to:
generate a first linear traffic feature line intersecting the first derived location and a second linear traffic feature line intersecting the second derviced location, wherein the first linear traffic feature line is parallel to the matched link, and the second linear traffic feature line is parallel to the second link;
identify an intersecting location between the first and second linear traffic feature lines; and
determine the intersection location as the linear traffic feature location.

6. The system of claim 1, wherein to generate the heading data, the at least one processor is further configured to:
determine a status of the linear traffic feature data associated with the matched link, wherein the status of the linear traffic feature data indicates at least one of discontinuous linear traffic feature data or continuous linear traffic feature data; and
generate the heading data, in response to determining the status of the linear traffic feature data is indicative of the discontinuous linear traffic feature data.

7. The system of claim 1, wherein to determine the linear traffic feature data associated with the matched link, the at least one processor is further configured to:
identify the matched link, based on map-matching the sensor data with map data; and
determine, using the map data, the linear traffic feature data associated with the matched link.

8. The system of claim 1, wherein the at least one processor is further configured to update map data to include the linear traffic feature location.

9. The system of claim 1, wherein the first perpendicular comprises a first leg that is parallel to the matched link and a second leg that is perpendicular with respect to the first leg, wherein the first derived location is positioned along the second leg, wherein the second perpendicular comprises a third leg that is parallel to the second link and a fourth leg that is perpendicular with repect to the third leg, and wherein the second derived location is positioned along the fourth leg.

10. A method for updating linear traffic feature data, the method comprising:
determining, from sensor data, the linear traffic feature data associated with a matched link;
generating heading data based on the linear traffic feature data, wherein the generation of the heading data comprises dropping a first perpendicular to the matched link and a second perpendicular to a second link connected to the matched link;
determining a first derived location along the first perpendicular and a second derived location along the second perpendicular;
determining a linear traffic feature location based on the first and second derived locations; and
updating the linear traffic feature data to include the linear traffic feature location.

11. The method of claim 10, wherein determining the first derived location along the first perpendicular and the second derived location along the second perpendicular further comprises:
identifying a distance between the linear traffic feature data and the matched link; and
determining each of the first derived location and the second derived location based on the distance and a link deviation location, wherein the link deviation location is an origin for determining the first derived location and the second derived location.

12. The method of claim 11, wherein generating the heading data further comprises:
determining a status of the linear traffic feature data associated with the matched link, wherein the status of the linear traffic feature data indicates at least one of discontinuous linear traffic feature data or continuous linear traffic feature data ; and
generating the heading data, in response to determining the status of the linear traffic feature data is indicative of the discontinuous linear traffic feature data.

13. The method of claim 11, wherein generating the heading data further comprises:
determining location data associated with the linear traffic feature data;
identifying a side of the linear traffic feature data with respect to the matched link, based on the location data; and
generating the heading data, based on the side of the linear traffic feature data.

14. The method of claim 13, wherein generating the heading data further comprises:
determining a plurality of shape locations associated with at least one of the matched link and the second link;
determining one or more of at least one matched heading between the plurality of shape locations associated with the matched link or at least one matched heading between the plurality of shape locations associated with the matched link and the plurality of shape locations associated with second link;
identifying the side of the linear traffic feature data with respect to the matched link, based on the location data and one or more of the at least one matched heading between the plurality of shape locations associated with the matched link or the at least one matched heading between the plurality of shape locations associated with the matched link and the plurality of shape locations associated with the second link; and
generating the heading data, based on the side of the linear traffic feature data.

15. The method of claim 10, wherein determining the linear traffic feature location further comprises:

generating a first linear traffic feature line intersecting the first derived location and a second linear traffic feature line intersecting the second derviced location, wherein the first linear traffic feature line is parallel to the matched link, and the second linear traffic feature line is parallel to the second link;

identifying an intersecting location between the generated first and second linear traffic feature lines; and determining the intersection location as the linear traffic feature location.

16. A computer program product comprising a non-transitory computer readable medium having stored thereon computer executable instructions which when executed by at least one processor, cause the processor to carry out operations for updating linear traffic feature data, the operations comprising:

determining, from sensor data, the linear traffic feature data associated with a matched link;

generating heading data based on the linear traffic feature data, wherein the generation of the heading data is based on a first perpendicular to the matched link and a second perpendicular to a second link connected to the matched link;

determining a first derived location along the first perpendicular and a second derived location along the second perpendicular;

determining a linear traffic feature location based on the first and second derived locations; and updating the linear traffic feature data to include the linear traffic feature location.

17. The computer program product of claim 16, wherein for generating the heading data, the operations further comprise:

determining location data associated with the linear traffic feature data;

identifying a side of the linear traffic feature data with respect to the matched link, based on the location data; and generating the heading data, based on the side of the linear traffic feature data.

18. The computer program product of claim 17, wherein for generating the heading data, the operations further comprise:

determining a plurality of shape locations associated with at least one of the matched link and the second link;

determining one or more of at least one matched heading between the plurality of shape locations associated with the matched link or at least one matched heading between the plurality of shape locations associated with the matched link and the plurality of shape locations associated with second link;

identifying the side of the linear traffic feature data with respect to the matched link, based on the location data and one or more of the at least one matched heading between the plurality of shape locations associated with the matched link or the at least one matched heading between the plurality of shape locations associated with the matched link and the plurality of shape locations associated with the second link; and generating the heading data, based on the side of the linear traffic feature data.

\* \* \* \* \*